United States Patent [19]

Muramatsu et al.

[11] Patent Number: 5,243,701
[45] Date of Patent: Sep. 7, 1993

[54] METHOD OF AND SYSTEM FOR PROCESSING DATA HAVING BIT LENGTH VARIABLE WITH MODES OF OPERATION

[75] Inventors: Kikuo Muramatsu; Osamu Ueda, both of Hyogo, Japan

[73] Assignee: Mitsubishi Denki Kabushiki Kaisha, Tokyo, Japan

[21] Appl. No.: 579,230

[22] Filed: Sep. 6, 1990

Related U.S. Application Data

[63] Continuation of Ser. No. 239,202, Aug. 30, 1988, abandoned.

[30] Foreign Application Priority Data

Sep. 17, 1987 [JP] Japan ............... 62-235322

[51] Int. Cl.⁵ .................................. G06F 13/00
[52] U.S. Cl. ................... 395/325; 364/240.3; 364/254.8; 364/254.9; 364/DIG. 1
[58] Field of Search ............... 395/425, 325; 341/50, 341/95

[56] References Cited

U.S. PATENT DOCUMENTS

| | | | |
|---|---|---|---|
| 4,145,753 | 3/1979 | Kashio | 364/900 |
| 4,188,669 | 2/1980 | Rauscher | 364/900 |
| 4,202,035 | 5/1980 | Lane | 364/200 |
| 4,296,469 | 10/1981 | Gunter | 364/200 |
| 4,309,754 | 1/1982 | Dinwiddie | 364/200 |
| 4,371,928 | 2/1983 | Barlow | 364/200 |
| 4,378,591 | 3/1983 | Lemay | 395/425 |
| 4,447,878 | 5/1984 | Kinnie | 364/200 |
| 4,502,115 | 2/1985 | Eguchi | 364/200 |
| 4,593,267 | 6/1986 | Kuroda | 364/900 |
| 4,654,781 | 3/1987 | Schwartz | 364/200 |
| 4,675,808 | 6/1987 | Grinn | 395/425 |
| 4,683,534 | 7/1987 | Tietjen | 364/200 |
| 4,875,157 | 10/1989 | Frimmel | 395/425 |
| 4,905,137 | 2/1990 | Goodhue | 395/425 |
| 5,034,879 | 7/1991 | Woodward | 395/375 |

OTHER PUBLICATIONS

Intel, Application Note, "The 8086 Family User's Manual", Oct. 1979, pp. 175–184.
Mitsubishi Denki Kabushiki Kaisha: "A Product of No. 27128", Tokyo, Japan, 198, pp. 3–5.

Primary Examiner—Robert B. Harrell
Assistant Examiner—Eric Coleman
Attorney, Agent, or Firm—Lowe, Price, LeBlanc & Becker

[57] ABSTRACT

Data processing system including memory device having even-numbered addresses and odd-numbered addresses in which both an even-numbered address and an odd-numbered address are accessed in the long data bit length mode and either an even-numbered address or an odd-numbered address is accessed in the short data bit length mode, comprising a switching circuit 200 for carrying out the data communication with an odd-numbered address through a high-order data bus 6 or a low-order data bus 5 in the short data bit length mode, and a switching circuit 150 for carrying out the data communication with an odd-numbered address through the low-order data bus 5 in both the long and short data bit length modes. By virtue of this structure, the data communication through the low-order data bus only is made possible for both an even-numbered address and an odd-numbered address in the short data bit length mode.

6 Claims, 22 Drawing Sheets

FIG. 4   PRIOR ART a) ADDRESS BUS b) DATA BUS
   (LESS SIGNIFICANT BYTE)
   $D_0 \sim D_7$ c) DATA BUS
   (MORE SIGNIFICANT BYTE)
   $D_8 \sim D_{15}$ d) THE ENABLE SIGNAL e) R/$\overline{W}$ SIGNAL

| MEMORY ADDRESS | MEMORY CONTENT |
|---|---|
| n + 4 | 8 - BIT  DATA |
| n + 3 | 8 - BIT  DATA |
| n + 2 | 8 - BIT  DATA |
| n + 1 | 8 - BIT  DATA |
| n | 8 - BIT  DATA | n: INTEGER

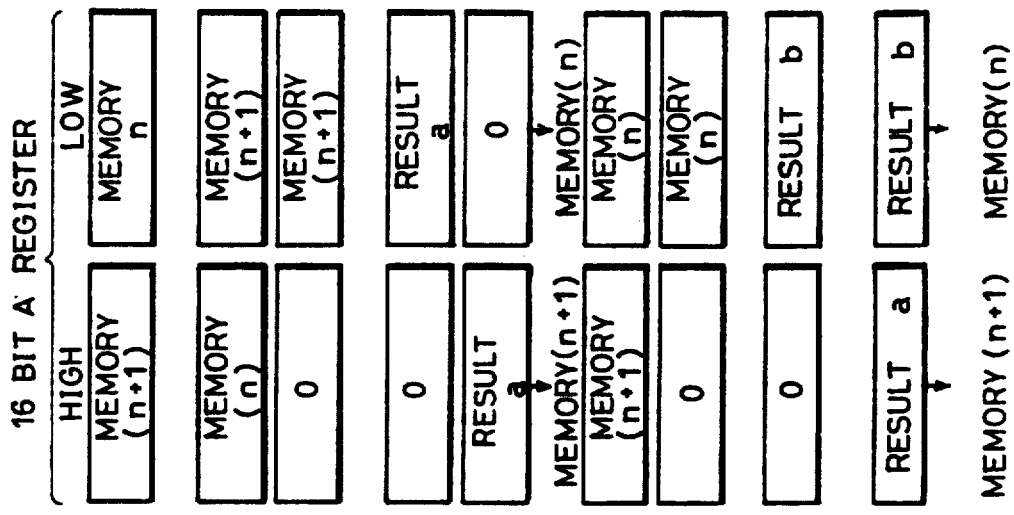

① LDA A, MEMORY n    ; A ← (MEMORY n+1)(MEMORY n)
② TAX                ; X ← A
③ RLA #8             ; SWAP HIGH BYTE FOR LOW BYTE
④ AND A, #00FFH      ; MASK HIGH BYTE
⑤ CLC                ; RESET CARRY FLAG
⑥ ADC A, PARAMT      ; A ← A + (PARAMT)
⑦ RLA #8             ; SWAP HIGH BYTE FOR LOW BYTE
⑧ STA A, MEMORY n    ; (MEMORY n+1)(MEMORY n) ← A
⑨ TXA                ; A ← X
⑩ AND A, #00FFH      ; MASK HIGH BYTE
⑪ CLC                ; RESET CARRY FLAG
⑫ ADC A, PARAMT      ; A ← A + (PARAMT)
⑬ CLC                ; RESET CARRY FLAG
⑭ ADC A, MEMORY n    ; A ← A + (MEMORY n+1)(MEMORY n)
⑮ STA A, MEMORY n    ; (MEMORY n+1)(MEMORY n) ← A

FIG.13

| MODE \ TERMINAL | $\overline{CE}$ | $\overline{OE}$ | VPP | Vcc | DATA INPUT/ OUTPUT |
|---|---|---|---|---|---|
| READING | L | L | 5 V | 5 V | OUTPUT |
| OUTPUT DISABLED | L | H | 5 V | 5 V | FLOATING |
| STAND-BY (POWER DOWN) | H | X | 5 V | 5 V | FLOATING |
| PROGRAM | L | H | 12.5 V | 6 V | INPUT |
| INHIBITING OF PROGRAM | H | H | 12.5 V | 6 V | FLOATING |
| VERIFICATION OF PROGRAM | H | L | 12.5 V | 6 V | OUTPUT |

X : ARBITRARY

CONNECTION
WITH CPU IN BYTE = L
(16 BIT BUS MODE)

FIG.16
3. ADDRESS BUS 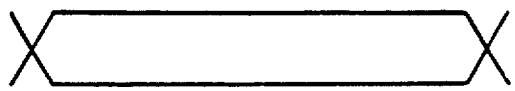
4. DATA BUS (LOW-ORDER) $D_0 - D_7$ 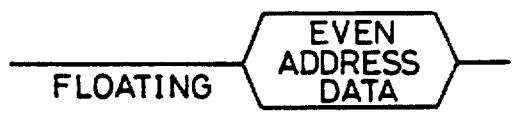
5. DATA BUS (HIGH-ORDER) $D_8 - D_{15}$ 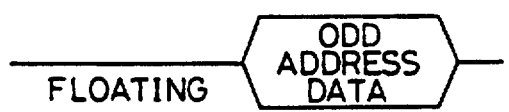
6. ENABLE SIGNAL E 
7. R/$\overline{W}$ SIGNAL 
BUS TIMING IN BYTE = L
( 16 BIT BUS MODE )

CONNECTION
WITH CPU IN BYTE = H
(8 BIT BUS MODE)

DESIGNATION OF MEMORY DATA ADDRESS
BYTE = H
( 8 BIT BUS MODE )

RELATION BETWEEN DATA IN MEMORY IC AND THOSE IN CPU REGISTERS IN BYTE = H

RELATION BETWEEN DATA OF MEMORY IC AND THOSE OF CPU REGISTERS IN BYTE=H

TRANSFERRENCE OF 1 BYTE DATA BETWEEN MEMORY IC AND CPU REGISTER

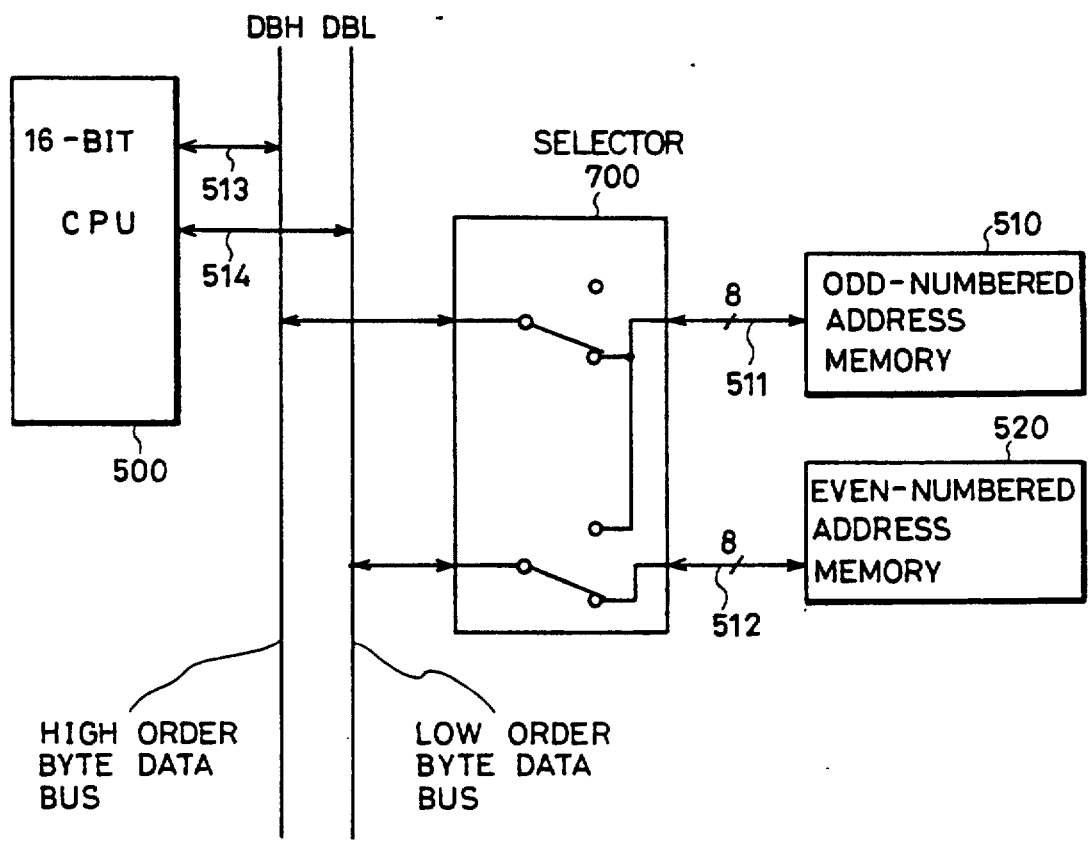

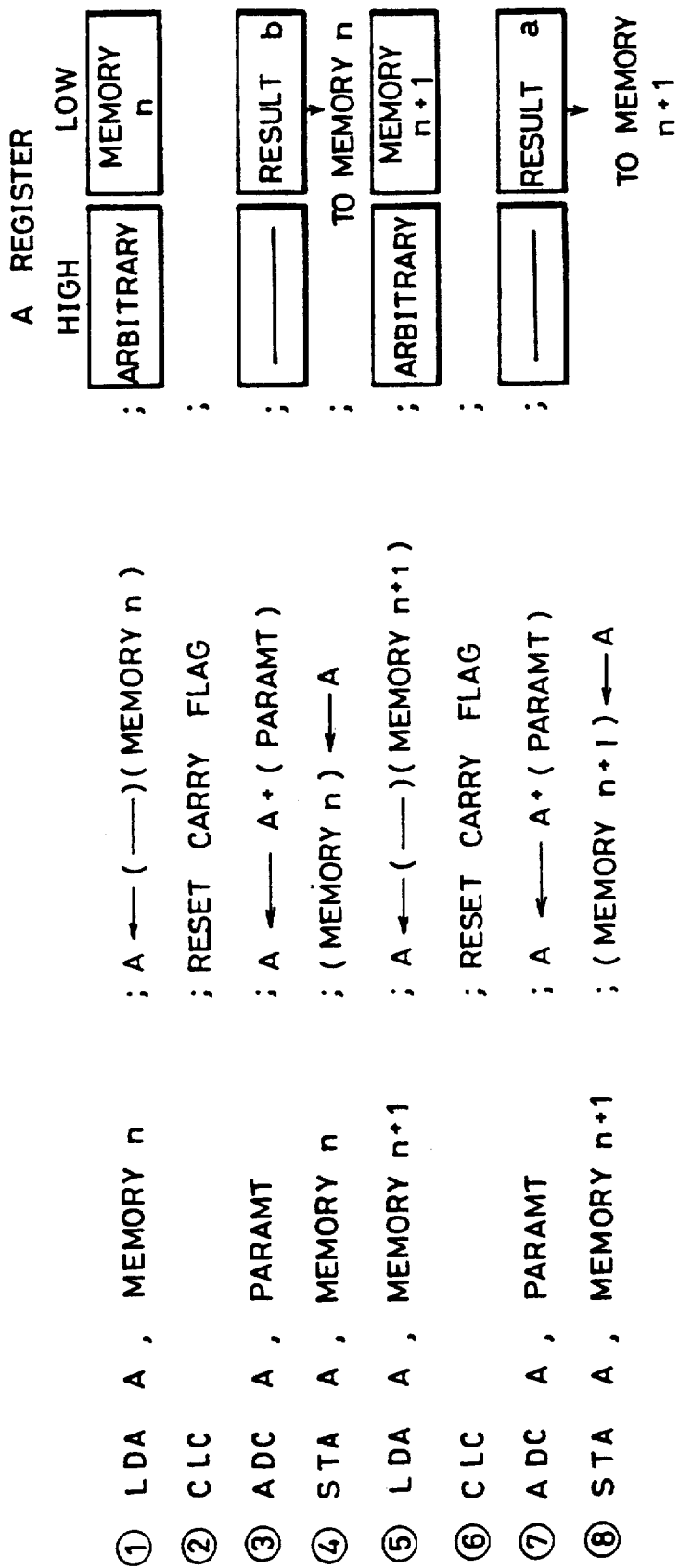

| | | |
|---|---|---|
| : | | |
| N+5 | 8-BIT | DATA |
| N+4 | 8-BIT | DATA |
| N+3 | 8-BIT | DATA |
| N+2 | 8-BIT | DATA |
| N+1 | 8-BIT | DATA |
| N | 8-BIT | DATA |
| (N=2n) | : | |

METHOD OF AND SYSTEM FOR PROCESSING DATA HAVING BIT LENGTH VARIABLE WITH MODES OF OPERATION

This application is a continuation application of application Ser. No. 07/239,202, filed Aug. 30, 1988 now abandoned.

BACKGROUND OF THE INVENTION

1. Field of the Invention

The present invention relates generally to a data process circuit for processing a data selectively in two different byte length and, more particularly, to a memory system accessible in $2^n$ (n is an integer) bits as well as in $2^m$ (m is an integer satisfying the condition of $m > n$) bits.

2. Description of the Prior Art

With evolution of the microcomputers, the number of bits constituting the data of the microcomputer is increased from 4 bits to 8 bits and from 8 bits to 16 bits. Specifically, 16-bit microcomputers have become widely used in such industrial field and in consumer field in which mainly 8-bit microcomputers were conventionally used, due to the strong demand for high operation performance. Commonly, an EPROM (Electrically Programmable Read Only Memory) for storing a user program suitable for its application is provided in a microcomputer, and an EPROM of 8 bit structure is generally used.

FIG. 1 shows one example of a system employing a conventional 8 bit EPROM and a 16 bit CPU. Referring to FIG. 1, the system comprises a 16 bit CPU (Central Processing Unit) 1 such as M37790 by Mitsubishi Denki Kabushiki Kaisha, Tokyo, Japan, two 8 bit EPROMs 2 and 3, that is, an EPROM 2 for the even-numbered address (less significant address) and an EPROM 3 for odd-numbered address (more significant address). Each EPROM is, for example, a product of No. 27128 by Mitsubishi Denki Kabushiki Kaisha, Tokyo, Japan.

The CPU 1 comprises an address terminal 51 for outputting 15 bit address signals A0 to A14, an input/output terminal 52 for the low-order (less significant) 8 bits data D0 to D7, an input/output terminal 54 for inputting and outputting the high-order (more significant) 8 bit data and a BHE terminal 53 for outputting a signal $\overline{BHE}$ designating the access to the high-order data of the odd-numbered address.

The EPROM 2 for the even-numbered address comprises an address input terminal 61 for receiving 14 bit address signals A1 to A14 out of 15 bit address signals A0 to A14 from the CPU 1, an output enable terminal 62 for receiving the least significant address signal A0 from the CPU 1, a data output terminal 63 for outputting 8 bit data D0 to D7 and a chip enable terminal 64 connected to the ground. Since the EPROM 2 is has its chip enable terminal 64 connected to the ground, it is always in the active state (enabled state). When a "L" signal is applied to the output enable terminal 62, the EPROM 2 is enabled to output from the terminal 63 a data stored in an address corresponding to that applied to the address input terminal 61.

The EPROM 3 for the odd-numbered address comprises an address input terminal 71 for receiving 14 bit address signals A1 to A14 from the CPU 1, an output enable terminal 72 for receiving the odd-numbered address access designating signal $\overline{BHE}$ from the CPU 1, a data output terminal 73 for outputting 8 bit data D0 to D7 in addresses corresponding to the address signals applied to the address input terminal 71 and a chip enable terminal 74 connected to the ground potential. Since the chip enable terminal 74 is connected to the ground potential, the EPROM 3 is always in the enabled state. When the byte high enable signal (odd-numbered address access designating signal) $\overline{BHE}$ applied to the output enable terminal 72 is "L", the EPROM 3 is enabled to output from the data output terminal 73 the content in the address designated by the address signals A1 to A14 applied to the address input terminal 71.

The 15 bit address signals A0 to A14 from the CPU 1 are sent onto a 15 bit address bus 4. The 8 bit data D0 to D7 from the EPROM 2 are applied to the low-order data input/output terminal 52 of the CPU 1 through a low-order 8 bit data bus 5. The 8 bit data from the EPROM 3 are applied to the high-order 8 bit data input/output terminal 54 of the CPU 1 through a high-order 8 bit data bus 6.

The selection of the even-numbered address and the odd-numbered address is carried out by the least significant address signal A0. Namely, when the address signal A0 is "0" ("L"), an even-numbered address is designated, and when the least significant address signal A0 is "1" ("H"), an odd-numbered address is designated.

When the byte high enable $\overline{BHE}$ signal is "L", it designates an access to an odd-numbered address and, when it is "H", it inhibits an access to the odd-numbered address.

FIG. 2 is a waveform diagram showing the data reading operation in a conventional structure employing a 16 bit CPU and a 8 bit EPROM. The operation will be hereinafter described with reference to the FIGS. 1 and 2.

Most of the CPUs having a 16 bit data bus are capable of simultaneously accessing successive even-numbered address and odd-numbered address for the two EPROMs 2 and 3 in the same CPU cycle. Description will be made of an operation in which the CPU 1 accesses the EPROMs 2 and 3 in 16 bits. First, even-numbered address signals A0 to A14 appear on the address bus 4. More specifically, the least significant address signal A0 is at "L" level. Thereafter, the $\overline{BHE}$ signal becomes "L" level and the address signals applied to the address bus 4 are drawn into each of the EPROMs 2 and 3. The least significant address signal A0 is applied to the output enable terminal 62 of the EPROM 2 for the even numbered address while the $\overline{BHE}$ signal is applied to the output enable terminal 72 of the EPROM 3 for the odd-numbered address. Therefore, both EPROMs 2 and 3 simultaneously enter the output enable state to output data in the addresses designated by the address signals A1 to A14. Since the address signals A1 to A14 are common to both of the EPROMs 2 and 3, the data outputted from both EPROMs 2 and 3 become a continuous 2 byte data comprising an even-numbered address and a following odd-numbered address. The data from the EPROM 2 for the even-numbered address is applied to the low-order data bus 5 through the data output terminal 63 while the 8 bit data from the EPROM 3 for the odd-numbered address is applied to the high-order data bus 6 from the data output terminal 73. The CPU 1 receives simultaneously the continuous 2 byte data through the low-order data bus 5 and the high-order data bus 6. The CPU 1 repeats the above described operation of reading the 16 bit data from the EPROMs 2 and 3, where necessary in view of the content to be processed.

Depending on the content to be processed, sometimes the CPU 1 requires only the byte unit (8 bit) data. In such case, only one of the least significant signal A0 and the $\overline{BHE}$ signal is made active ("L" level) for accessing the EPROM 2 or 3. Namely, in accessing the EPROM 3 for the odd-numbered address, the least significant address signal A0 is made "1" ("H") and the $\overline{BHE}$ signal is made "L". On this occasion, a "H" signal is applied to the output enable terminal 62 of the EPROM 2 for the even-numbered address, so that the EPROM 2 becomes output disabled state. Meanwhile, since an "L" signal is applied to the output enable terminal 72 of the EPROM 3 for the odd-numbered address, the EPROM 3 becomes output enabled state and it outputs, on the high-order data bus 6, 8 bit data in an address corresponding to the address signals A1 to A14 applied from the CPU 1. As a result, an 8 bit data from the odd-numbered addresses is read out.

In accessing the EPROM 2 for the even-numbered address only, the least significant address signal A0 is made "0" ("L" level) and the $\overline{BHE}$ signal is made "H". Therefore, the EPROM 3 for the odd-numbered address becomes output disabled state while the EPROM 2 for the even-numbered address becomes output enabled state and the EPROM 2 outputs, on the low-order data bus 5, 8 bit data in address corresponding to the address signals A1 to A14 applied through the address bus 4.

In either operation, namely, in accessing in unit of 8 bits or in accessing in unit of 16 bits, data stored in an even-numbered address appears on the low-order data bus 5 while data stored in an odd-numbered address appears on the high-order data bus 6.

The system can be constituted by a 16 bit EPROM instead of the above described two 8-bit EPROMs.

FIG. 3 shows a conventional connection between the CPU and EPROM in a system employing a 16 bit EPROM.

Referring to FIG. 3 the 16 bit CPU 1 comprises an address output terminal 55 for outputting 15 bit address signals A0 to A14, a data input/output terminal 56 for inputting and outputting the low order 8 bit data D0 to D7, a data input/output terminal 57 for inputting and outputting the high-order 8 bit data D8 to D15, an enable terminal 58 for outputting an enable signal $\overline{E}$ for activating the memory and a terminal 59 for outputting read/write signal R/$\overline{W}$ designating the writing/reading operation of the memory.

The 16 bit EPROM 2a comprises an address input terminal 65 for receiving 14 bit address signals A1 to A14, the data output terminal 66 for outputting the low-order 8 bit data D0 to D7, a data output terminal 67 for outputting the high order 8 bit data D8 to D15, a chip enable terminal 68 for receiving an enable signal $\overline{E}$ from the CPU 1 and an output enable terminal 69 for inverting and receiving the read/write signal R/$\overline{W}$ from the CPU 1. When a "L" signal is applied to the chip enable terminal 68, the EPROM 2a becomes the enabled state and when a "L" signal is applied to the output enable terminal 69, it becomes the output enable state.

FIG. 4 is a waveform diagram showing the data reading operation of a case in which the 16-bit word EPROM shown in FIG. 3 is employed. The data reading operation with a conventional 16 bit EPROM employed will be described with reference to the FIGS. 3 and 4.

Address signals A0 to A14 are supplied onto the address bus 4 from the CPU 1. Then the enable signal $\overline{E}$ from the CPU 1 falls so that the EPROM 2a enters the enabled state and it takes the 14 bit address signals A1 to A14 on the address bus 4 in and outputs data in address corresponding to the supplied address signals. On this occasion, the read/write signal R/$\overline{W}$ is "H" for the reading operation and a "L" signal is applied to the output enable terminal 69. Therefore, the EPROM 2a enters output enable state and the 16 bit data stored in the address corresponding to the supplied address signals A1 to A14 is transferred onto the data buses 5 and 6. The CPU 1 receives the low-order 8 bit data read out onto the data bus 5 through a low-order 8 bit data input terminal 50. Meanwhile, the high-order 8 bit data D8 to D15 are supplied to the high-order data input terminal 57 of the CPU 1 through the high-order data bus 6. On this occasion, the EPROM 2a sends out the content in the address corresponding to the supplied address signals A1 to A14, so that 8 bit information in an even numbered address and 8 bit information of the odd numbered address following the accessed even numbered address are simultaneously read out.

Other than the above described structure employing the EPROM, the CPU comprises a random access memory for storing data and the like. In this case, 16-bit random access memory is employed. This random access memory (RAM) has even-numbered addresses and odd-numbered addresses for storing data of a byte size, respectively, and the word size (16 bit) data is constituted by data in successive even-numbered address and odd-numbered address data. In this case also, the data of the even-numbered address is outputted to the low-order 8 bit data bus while the data of the odd-numbered address is outputted to the high-order 8 bit data bus. Namely, it should be understood that the EPROM of FIG. 3 is replaced by the RAM.

FIG. 5 shows a relation between the address and the data bus when a conventional 8 bit memory or 16 bit memory is connected to a CPU having a 16 bit data bus. As can be seen from FIG. 5, either in the 8 bit memory or in the 16 bit memory, the address is designated by the address signals A1 to A14, so that the address N (N is an integer) and address N+1 are simultaneously accessed. More specifically, an even-numbered address and the successive odd-numbered address are designated by the address signals A1 to A14. At this time, the data in the even-numbered address appears on the low-order data bus while the data in the odd-numbered address appears on the high-order data bus.

Generally, a CPU has a register for storing data, program and the like. As for the register in the CPU, the register connected to the high-order data bus and the register connected to the low-order data bus are fixed. Namely, as shown in FIG. 6, the register B is connected to the high-order data bus and therefore connected to the odd-numbered address of the memory while the register A is connected to the even-numbered address through the low-order data bus. This structure brings about some problems as to be described in the following. Namely, depending on the content of the processing by the CPU, there is a case in which only the high-order 8 bit data is required and not the low-order 8 bit. In other words, there is a case in which 8 bit data from the odd-numbered address only is needed. Since the CPU is commonly structured such that the register A is accessed earlier, in such case the content in the register B should be once transferred to the register A to be read. In such case, a register exchange instruction such as "XCH" is prepared to exchange the contents of the register B and register A. However, when the content in the register B is transferred to the register A, in a common structure, the content is transferred in bit-by-bit shifting. Therefore, the exchange takes much time and therefore there arises another problem that desired arithmetical processing and data processing are not carried out at high speed. More specifically, when a certain processing is desired using 8 bit data only of the odd-numbered address, the 8 bit data is always stored in the high-order register B, so that the data should be once transferred to the register A. Consequently, the processing using the data of the odd-numbered address can not be carried out at high speed. This problem will be described more specifically, in the following, with reference to FIGS. 7 through 9. Now, discussed is a case where a certain operation is performed on each 8-bit data stored in two 8-bit memories, and a resultant data is again stored in original memory location by a 16-bit CPU, in a memory system as shown in FIG. 7. In FIG. 7, the memory system includes a 16-bit CPU 500, a memory 510 for storing 8-bit data of odd-numbered address and a memory 520 for storing 8-bit data of even-numbered address. The memory 510 is connected through an eight bit data bus 511 to a high-order byte data bus DBH. The memory 520 is connected through an 8-bit data bus 512 to a low-order data bus DBL. The 16-bit CPU 500 receives and transmits data of odd-numbered addresses from/to the data bus DBH and data of even-numbered addresses from/to the data bus DBL. The memory mapping or memory locations of the memory system of FIG. 7 is shown in FIG. 8. A program employed in the process is shown in FIG. 9A, as an example. FIG. 9B represents operational significance of each step in the program, and FIG. 9C shows the content in a 16-bit register A provided in the CPU 500 after completion of corresponding program step. It should be noted that the 16-bit register A is what is different from the 8-bit register A shown in FIG. 6.

When the CPU performs 8-bit data processing, it first accesses to both memories 510 and 520 to load the accessed 16 bit data in the 16-bit register A with the data of odd-numbered address and the data of even-numbered address stored in high-order 8-bit position and low-order 8-bit position in the register A, respectively. Then, low byte data is processed by the CPU 500 to provide a result a, since only low byte data in the register A can be processed in 8-bit processing mode. Byte swap operation is performed, and the content of the register A is once saved in the original locations of the memories 510 and 520. Again, the same sequence as that described above is performed to store the result a (first result) and the result b (second result) in the original locations of respective memories 510 and 520. As explicitly shown in FIGS. 9A to 9C, byte swapping operation of "RLA #8" is executed several times. This byte swapping is performed by shifting the data in the register A bit by bit, and it requires much time. In addition, when the program forms a looped routine, the time required in the byte swapping process is accumulated to prevent fast completion of the program.

Further, there is another problem that the contents in the 8-bit register A (or low byte register) can not be saved in the odd-numbered address, i.e., high byte data memory.

In addition, when a 16-bit EPROM is constituted by two EPROMs which can process 8 bit data only, EPROMs for the even-numbered address and for the odd-numbered address must be used in a pair. In such case, when a wrong EPROM is taken for the pair, or the assembling position of the pair of EPROMs is inverted, the data stored in the pair of EPROMs have no continuity. Consequently, the address signals generated by the CPU do not correspond to the stored content, so that the system including the CPU and memory do not operate correctly. The reason for this is that a 8-bit PROM writer is usually used for programming the 8-bit EPROM and the programming of EPROMs is carried out one by one so that the program for the even-numbered address and the program for the odd-numbered address should be separately made in the two EPROMs, respectively. Further, in a multi CPU system having an additional 8-bit CPU 600 coupled to the low byte data bus DBL, as shown in FIG. 10, the 8-bit CPU 600 can not access the memory for storing 8-bit data of odd-numbered addresses. That is, referring to FIG. 11 representing the memory mapping for the multi CPU system of FIG. 10, the 8-bit CPU 600 can not perform any operation on data of odd-numbered addresses N+i (N=2n, i=1, 2, ...) shown by hatched regions in FIG. 10, which degrades the performance of a multi CPU system with at least one CPU processing data of different bit length.

SUMMARY OF THE INVENTION

An object of the present invention is to eliminate the above described disadvantages of the conventional data processing system to provide an improved data processing circuit capable of processing $2^n$-bit data and $2^m$-bit data, where m > n.

Another object of the present invention is to provide a data processing system programming an odd-numbered and even-numbered address in EPROM.

It is still another object of the invention to provide a memory circuit having a data flow controller for enabling data accessing in $2^n$ bits and $2^m$ bits, where m and n are integers satisfying the condition of m > n.

It is still further, another object of the invention to provide an improved method for processing data in $2^n$ bits and $2^m$ bits.

It is a further object of the present invention to provide a 16-bit EPROM which can be programmed by a conventional 8-bit PROM writer.

The data processing system in accordance with the present invention comprises a memory device which is accessible at least in $2^n$ bits and has $2^m$ (m > n) first data input/output terminals, $2^m$ second data input/output terminals for receiving and sending data from and to the CPU, and means in response to the data bit length designating signal, high-order data activating signal and high-order/low-order address designating signal for selectively connecting, when the data bit length designating signal designates $2^n$ bit, the corresponding $2^n$ first data input/output terminals to the low-order $2^n$ bit of the second data input/output terminals.

In the above described structure, when the data bit length designating signal designates the $2^m$ bit, $2^m$ or $2^n$ first data input/output terminals are connected to $2^m$ or corresponding second data input/output terminal according to the high-order data activating signal and the high-order/low-order address designating signal and, when the data bit length designating signal designates $2^n$ bit, the $2^n$ bit first data input/output terminal selected by the address signal is selectively connected to the low-order $2^n$ bit input/output terminal out of the second input/output terminals. Therefore, in accessing in $2^n$ bits, data selectively appear only on the low-order $2^n$ bit second data input/output terminal. Consequently, high speed operation can be carried out without the need of exchange of the contents in the high-order and low-order registers in the CPU, the memory used in the conventional 8 bit CPU can be used in the 16 bit CPU, the data base used in the 8 bit CPU can be used in the 16 bit CPU, and PROM writer usually used for programming an 8-bit EPROM can be used for programming the memory, therefore a 16 bit computer system can be structured using the prior art as it is.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows waveforms illustrating the data reading operation when a 16 bit EPROM is used;

FIG. 9A, 9B, 9C represents an example of a program for processing 8-bit data in a 16-bit CPU system of FIG. 7;

FIG. 13 shows the relation between the operation modes and the voltage applied to the terminals of the memory shown in FIG. 12;

FIG. 16 shows the timing of reading/writing of data in the system structure shown in FIG. 15;

FIG. 23 is a schematic of a memory system according to an embodiment of the present invention;

FIG. 24 represents a memory mapping of the system of FIG. 23;

FIG. 25A represents an example of a program for processing 8-bit data in the 16-bit CPU system of FIG. 23;

FIG. 25B shows data flow at each step of the program of FIG. 25A.

FIG. 25C shows a content of 16-bit register in the CPU at each step of the program of FIG. 25A;

DESCRIPTION OF THE PREFERRED EMBODIMENTS

An embodiment of the present invention will be hereinafter described with reference to the figures.

Figure 12:
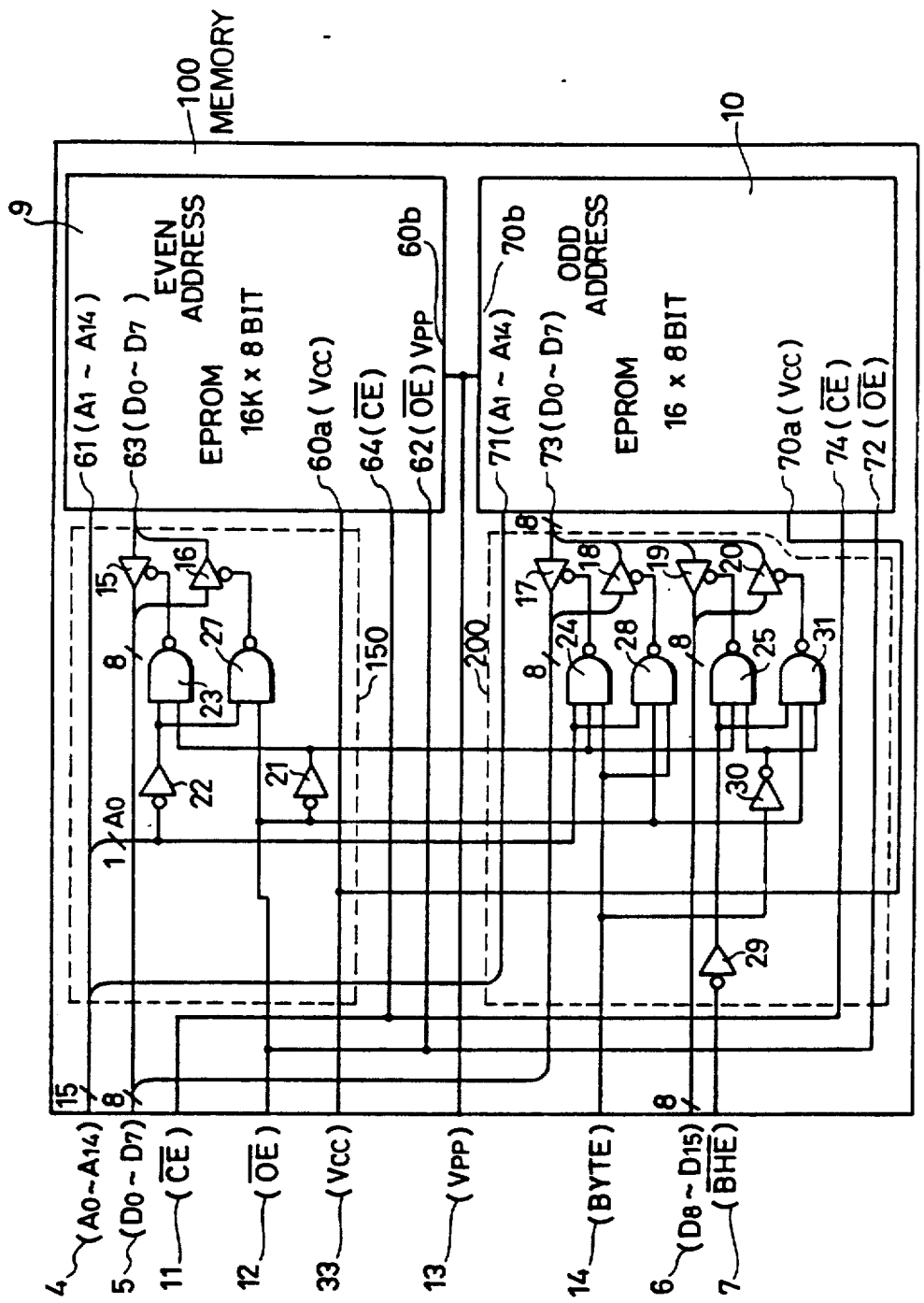
FIG. 12 shows one example of a structure of a memory IC in accordance with one embodiment of the present invention.

FIG. 12 shows a structure of a memory IC in accordance with one embodiment of the present invention. Referring to FIG. 12, the memory IC 100 comprises an 8 bit EPROM 9 storing data of the even-numbered address and an 8 bit EPROM 10 storing data of the odd-numbered address, constituting an EPROM which is accessible in either 16 bit or 8 bit data bit length.

The memory IC 100 comprises a decoder circuit 150 which selectively connects the 8 bit data input/output terminal 63 of the EPROM 9 of the even-numbered address to the data input/output terminal 5 (low-order data bus) of the low order 8 bit of the memory IC in response to the least significant address signal A0 designating the even-numbered address/odd-numbered address and to an output enable signal $\overline{OE}$, and a decoder circuit 200 which selectively connects the data input/output terminal 73 of the EPROM 10 for the odd-numbered address to the high-order 8 bit data bus 6 (high-order 8 bit data output terminal of the memory IC 100) or to the low-order 8 bit data bus (low-order 8 bit data output terminal of the memory IC), in response to the least significant address signal A0, high-order data activating signal $\overline{BHE}$ and to the mode designating (bit length designating) signal BYTE.

The decoder circuit 150 comprises a path for reading data of the EPROM 9 in response to the least significant address signal A0 and to the output enable signal OE, and a path for writing data applied to the low-order 8 bit data bus 5 to the data input terminal 63 of the EPROM 9 for the even-numbered address in response to the least significant address signal A0 and the output enable signal $\overline{OE}$.

The data reading path comprises an inverter 21 for inverting and outputting the output enable signal $\overline{OE}$, an inverter 22 for inverting and outputting the least significant address signal A0, and NAND gate 23 outputting the negative logical product of the outputs of the inverters 21 and 22 and a data reading transfer gate 15 which turns on in response to the output of the NAND gate 23 for connecting the data input/output terminal 63 of the EPROM 9 to the low-order 8 bit data bus 5.

The data writing path comprises an NAND gate 27 outputting the negative logical product of the output enable signal $\overline{OE}$ and the output of the inverter 21, and a data writing transfer gate 16 which selectively connects the data input/output terminal 63 to the low-order 8 bit data bus 5 in response to the output of the NAND gate 27. Both transfer gates 15 and 16 become conductive when a "L" signal is applied to its control terminal.

The decoder circuit 200 comprises a path for connecting the data input/output terminal 73 of the EPROM 10 to the low-order 8 bit data bus 5 and a path for connecting the data input/output terminal 73 to the high-order 8 bit data bus 6.

The path for connecting the low-order 8 bit data bus 5 comprises a reading path and a writing path. The reading path to the low-order 8 bit data bus 5 comprises an NAND gate 24 which makes the negative logical product of the least significant address signal A0, the output of the inverter 21 and the BYTE signal, and a data reading transfer gate 17 which becomes conductive in response to the output of the NAND gate 24. The data writing path comprises an NAND gate 28 which makes the negative logical product of the least significant address signal A0, output enable signal $\overline{OE}$ and the BYTE signal, and a data writing transfer gate 18 which turns on in response to the output of the NAND gate 28. The transfer gates 17 and 18 turn on when a "L" signal is applied to respective control input terminals and connect respective data output terminals 73 of the EPROM 10 to the low-order 8 bit data bus 5.

Similarly, the connecting path to the high-order 8 bit data bus 6 comprises a data writing path and a data reading path. The data writing path comprises an inverter 29 for inverting and outputting the $\overline{BHE}$ signal, an inverter 30 for inverting and outputting the BYTE signal, an NAND gate 25 which makes the negative logical product of the outputs of the inverters 21, 29 and 30, and a data reading transfer gate 19 which turns on in response to the output of the NAND gate 25. The data writing path comprises an NAND gate 31 which makes the negative logical product of the output of the inverter 29, output of the inverter 30 and the output enable signal $\overline{OE}$, and a data writing transfer gate 20 which turns on in response to the output of the NAND gate 31. The transfer gates 19 and 20 both turn on when a "L" signal is applied to respective control input terminals and connect the data input/output terminal 73 of the EPROM 10 to the high-order 8 bit data bus 6. In the above described structure, the switching of the connecting terminal of the data input/output terminal 73 of the EPROM 10 for the odd-numbered address is carried out by the BYTE signal.

The memory IC 100 comprises an address input terminal connected to the address bus 4, a low-order 8 bit data input/output terminals connected to the low-order 8 bit data bus 5, a chip enable input terminal 11 receiving the chip enable signal $\overline{CE}$, an output enable terminal 12 receiving the output enable signal $\overline{OE}$, a supply terminal 33 receiving the supply potential $V_{cc}$, a high voltage terminal 13 receiving the high voltage $V_{pp}$ for programming, a BYTE terminal 14 receiving the BYTE signal, a high-order 8 bit data input terminal connected to the high-order 8 bit data bus 6, and a terminal receiving the byte high enable signal $\overline{BHE}$. In the structure of FIG. 12, the data buses 5 and 6, address bus 4 and the signal line 7 also show the input/output terminals of the memory IC 100, respectively. The EPROMs 9 and 10 comprise address input terminals 61 and 71, data input/output terminals 63 and 73, supply terminal 60a and 70a, chip enable terminals 64 and 74, output enable terminals 62 and 72 and high voltage terminals 60b and 70b, respectively.

FIG. 13 shows the relation between the operation modes of the EPROM shown in FIG. 12 and the signals applied to each of the input terminals in accordance with each of the operation modes. As is shown in FIG. 13, the EPROMs have a reading mode, output disable state (the state in which the data output terminal is in the floating state), a standby mode in which the EPROMs are not accessed, a program mode in which the program is written, a program verify mode for verifying the written program, and a program inhibition mode. The program inhibition mode denotes the state in which a program cannot be externally written even if the high voltage $V_{pp}$ for programming is applied. The operation of the memory IC in accordance with one embodiment of the present invention will be hereinafter described with reference to FIGS. 12 and 13. First, description will be made of a case in which a "L" level voltage is applied to the BYTE terminal 14.

Figure 1:
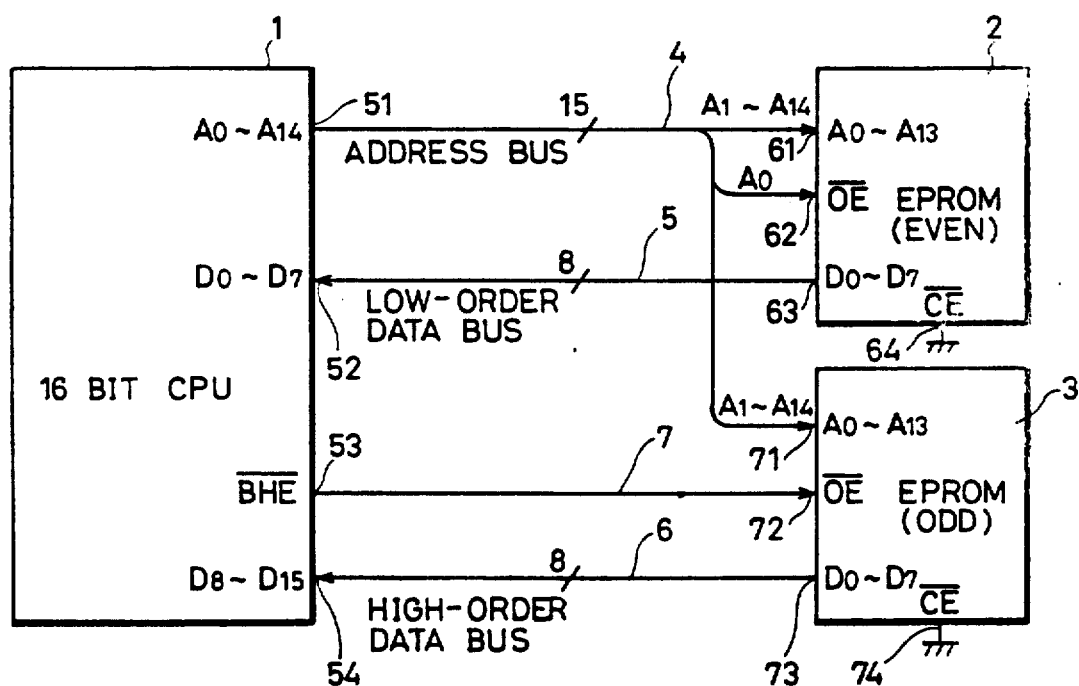
FIG. 1 shows one example of a system structure employing a conventional 16 bit CPU and 8 bit EPROMs.
Figure 2:
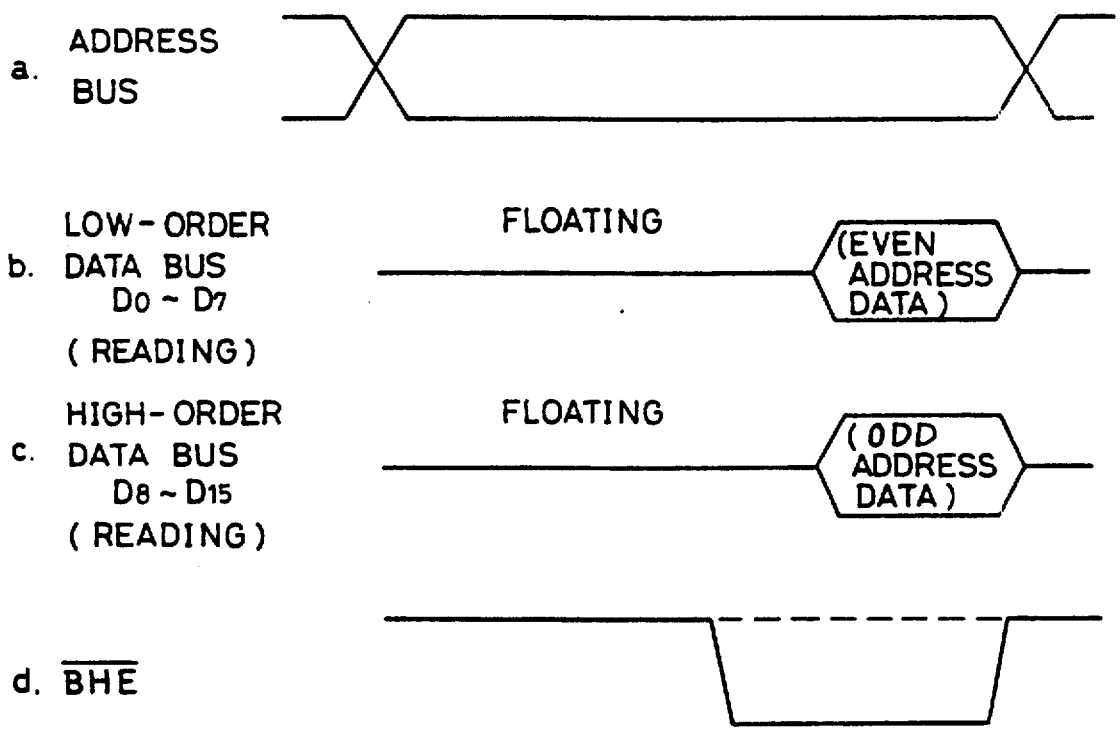
FIG. 2 shows waveforms in the data reading mode of the memory system shown in FIG. 1.
Figure 3:
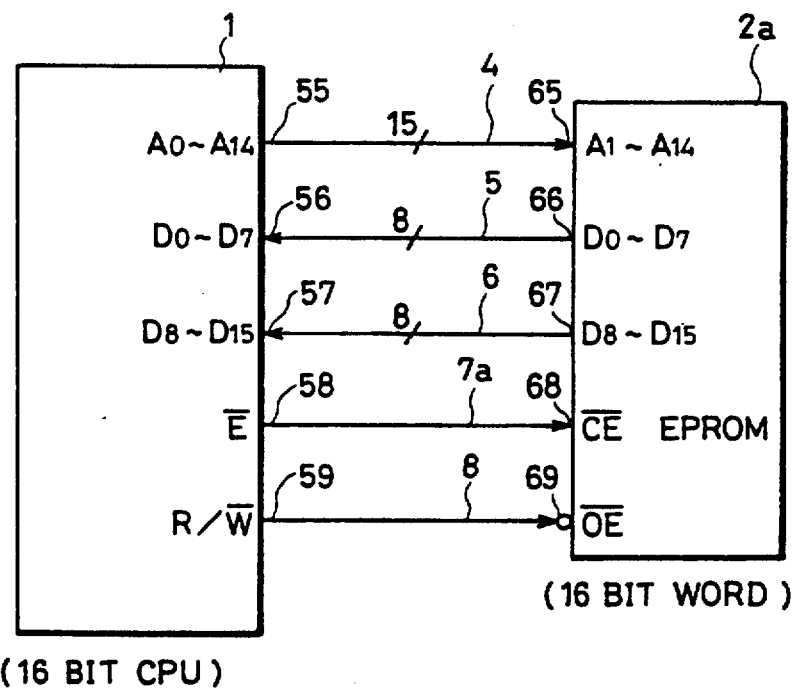
FIG. 3 shows one example of the connection in a computer system comprising a conventional 16 bit CPU and a 16 bit EPROM.
Figure 5:
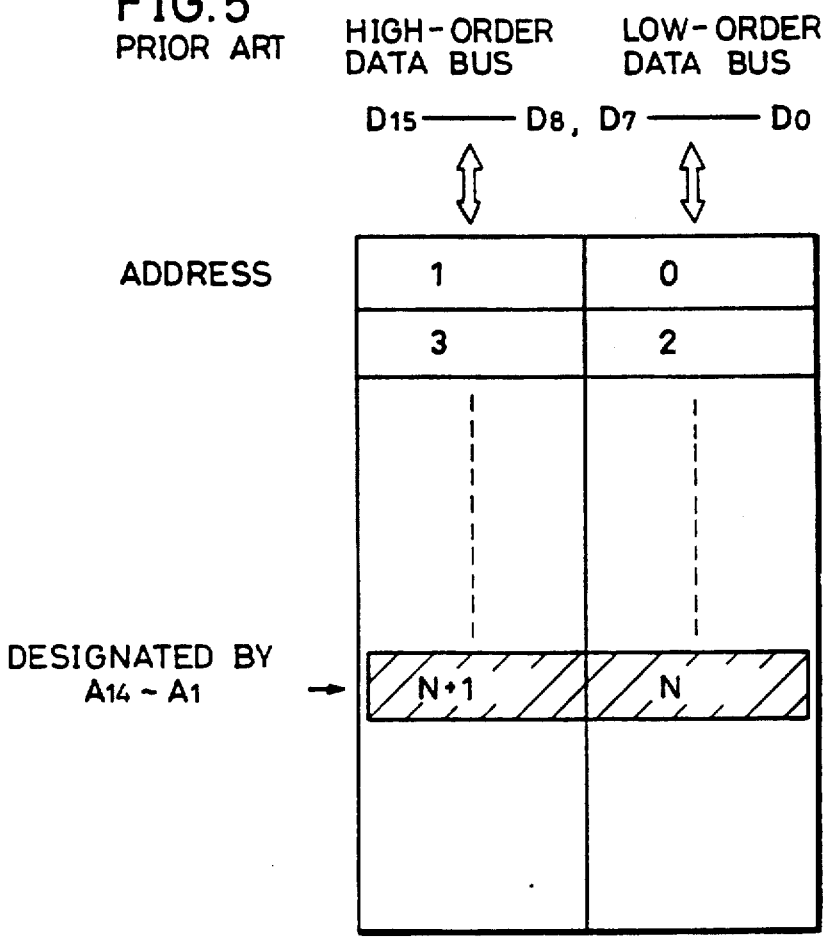
FIG. 5 shows the corresponding relation between the memory address and the data bus in a conventional 16 bit memory system.
Figure 6:
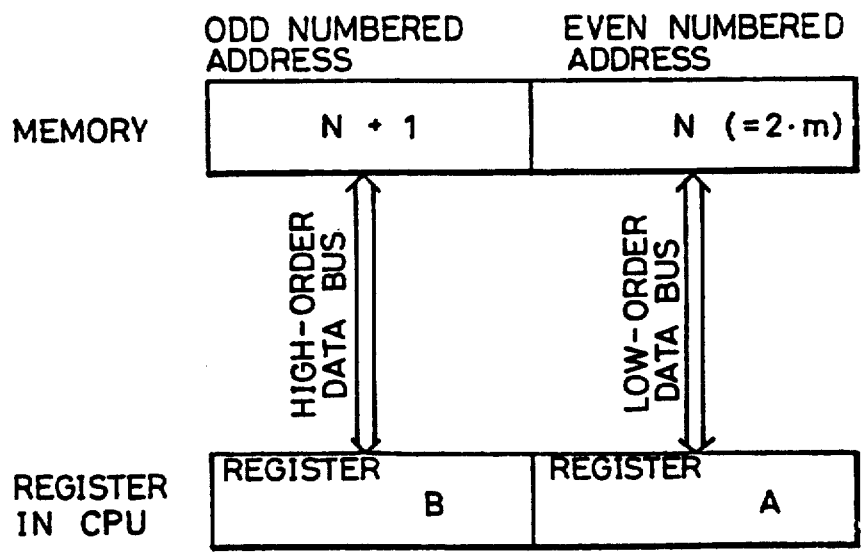
FIG. 6 shows the corresponding relation between the memory address and the registers in the CPU in a conventional 16 bit CPU.
Figures 7, 8:
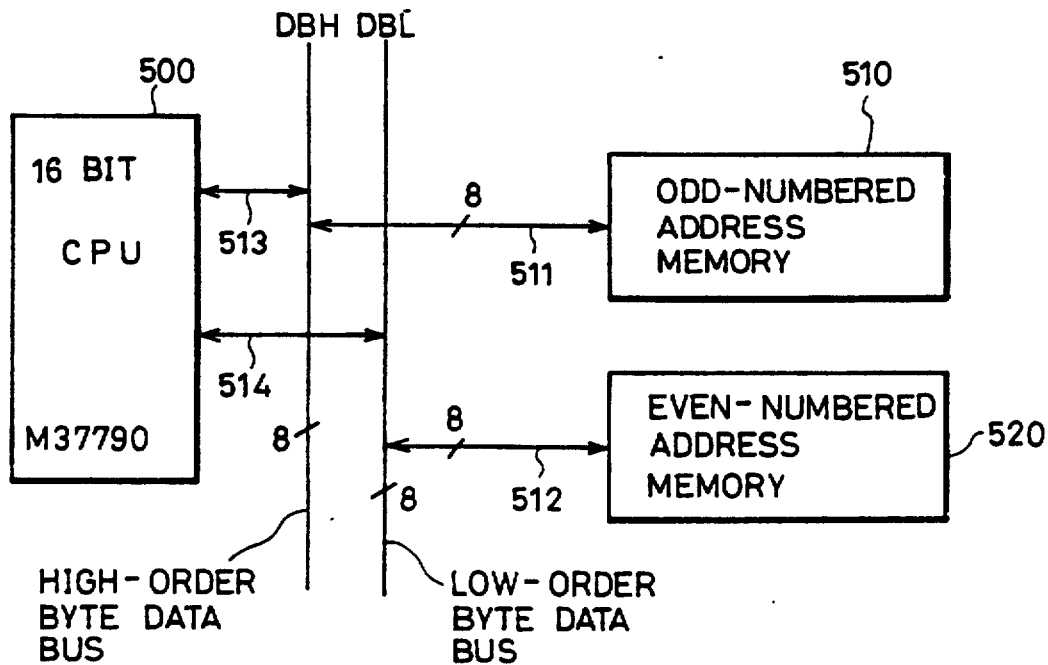
FIG. 7 is a schematic of a conventional memory system.
FIG. 8 shows a memory mapping for the system of FIG. 7.
Figure 10:
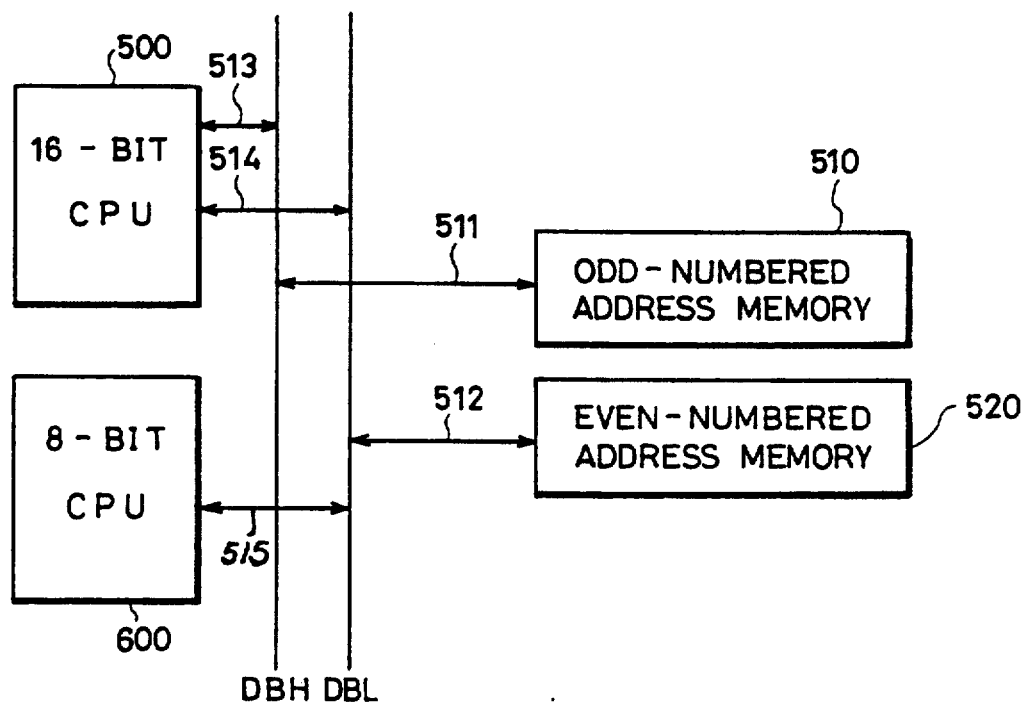
FIG. 10 is a schematic of a conventional multi CPU system comprising an 8-bit CPU and a 16-bit CPU.
Figure 11:
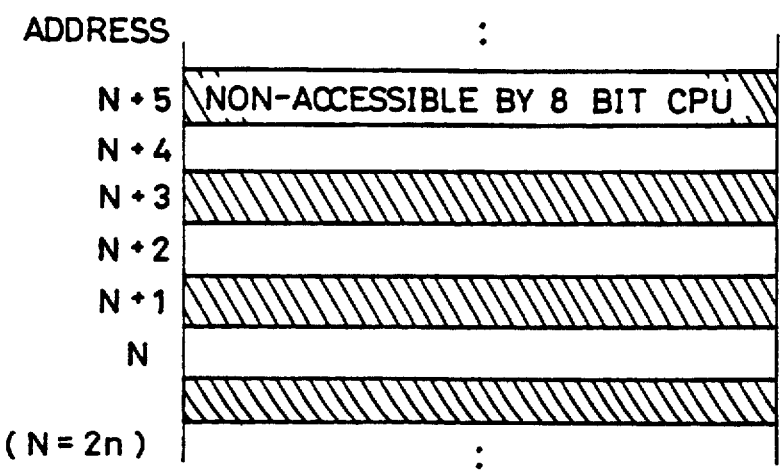
FIG. 11 represents a memory mapping of the multi CPU system of FIG. 10.

The EPROMs 9 and 10 have the same structure as the EPROMs 2 and 3 shown in FIG. 1. The description will be made of a case in which the CPU (not shown in FIG. 12) accesses the EPROM, that is, the memory IC 100 accesses in 16 bits. On this occasion, address signals A0 to A14 which appear on the address bus 4 are even-numbered address signals and the least significant signal A0 becomes "0" ("L") level. 14 bit address signals A1 to A14 are applied to the respective address input terminals 61 and 71 of the respective EPROMs 9 and 10. When the address on the address bus 4 is established, the byte high enable signal BHE and the chip enable signal $\overline{CE}$ from the CPU become the active state "L". In response to the $\overline{BHE}$ signal and the $\overline{CE}$ signal, the address signals on the address data bus 4 are taken in the EPROMs 9 and 10 of the memory IC. In reading the data of the EPROM, the chip enable signal $\overline{CE}$ applied to the chip enable terminal 11 in synchronization with the $\overline{BHE}$ signal and the output enable signal $\overline{OE}$ applied to the terminal 12 both become "L" level. On this occasion, the output enable signal $\overline{OE}$ is at the "L" level, so that the output of the inverter 21 becomes "H". Meanwhile, since the least significant address signal A0 is also at "L", the output of the inverter 22 also becomes "H". Therefore, the output of the NAND gate 23 receiving the outputs of the inverters 21 and 22 becomes "L" and the transfer gate 15 turns on. On the other hand, the output of the NAND gate 27 receiving the output enable signal $\overline{OE}$ and the output of the inverter 22 becomes "H" and the transfer gate 16 turns off. Consequently, the 8 bit data input/output terminal 63 of the EPROM 9 is connected to the low-order 8 bit data bus 5. In the EPROM 10 for the odd-numbered address, since the BYTE signal is at the "L" level, the outputs of both NAND gates 24 and 28 are at the "H" level and the transfer gates 17 and 18 are off. Therefore, the data input/output terminal 73 of the EPROM 10 is isolated from the low-order 8 bit data bus 5. Now, as the $\overline{BHE}$ signal is at the "L" level, the output of the inverter 29 is at the "H" level. As the BYTE signal is at the "L" level, the output of the inverter 30 is also at the "H" level. Since the outputs of the inverters 21, 29 and 30 are "H", the output of the NAND gate 25 becomes "L", so that the transfer gate 19 turns on. On the other hand, the output enable signal $\overline{OE}$ of "L" level is applied to the NAND gate 31, so that the output thereof becomes "H" level and the transfer gate 20 turns off. Therefore, for reading data, the data input/output terminal 73 of the EPROM 10 for the odd-numbered address is connected to the high-order 8 bit data bus 6 through the transfer gate 19. As a result, 16 bit data is read.

When the CPU reads data in 8 bits, in this 16 bit bus mode, namely, under the condition of the BYTE signal being "L", there exist two signal states. Namely, ① chip enable signal $\overline{CE}$, output enable signal $\overline{OE}$ and byte high enable signal $\overline{BHE}$ are at "L" level and the least significant address bit signal A0 is at "1" ("H") level and ② chip enable signal $\overline{CE}$, output enable signal $\overline{OE}$ and least significant address signal A0 are at "L" and the bit high enable signal $\overline{BHE}$ is at "H". In the former signal state ①, the address signal is an odd-numbered address. On this occasion, since the output of the inverter 22 becomes "L", the outputs of the NAND gates 23 and 27 both become "H" and the transfer gates 15 and 16 both turn off. Therefore, the data input/output terminal 63 of the EPROM 9 for the even-numbered address and the low-order 8 bit data bus are isolated from each other. On the other hand, since the byte high enable signal $\overline{BHE}$ is at the "L" level, the output of the inverter 29 is at "H" and since the BYTE signal is at "L", the output of the inverter 30 is at "H". On this occasion, the output of the inverter 21 is at "H". Therefore, the outputs of the NAND gates 24, 28 and 31 become "H" level and only the output of the NAND gate 25 becomes "L" level. Consequently, a "L" signal is applied only to the control input of the transfer gate 19 to turn the same on. As a result, the data input/output terminal 73 of the EPROM 10 for the odd-numbered address is connected to the high-order 8 bit data bus 6. Therefore, the data in an odd-numbered address is read on the high-order 8 bit data bus 6.

In the state ②, since the byte high enable signal $\overline{BHE}$ is at the "H" level, the output of the inverter 29 becomes "L" level and the outputs of the NAND gates 25 and 31 both become "H" level. Consequently, transfer gates 19 and 20 both turn off. Therefore, the data input/output terminal 73 of the EPROM for the odd-numbered address are isolated from both the high-order data bus 6 and the low-order 8 bit data bus 5. Meanwhile, since the address signal denotes an even-numbered address, the least significant address signal A0 is at the "L" level and the output of the inverter 22 is at the "H" level. On the other hand, since the output enable signal $\overline{OE}$ is at the "L" level, the output of the inverter 21 becomes "H" level. Consequently, the output of the NAND gate 23 becomes "L" level, the output of the NAND gate 27 becomes "H" level, only the transfer gate 15 turns on and the data input/output terminal 63 of the EPROM 9 for the odd-numbered address is connected to the low-order 8 bit data bus 5. As a result, the data of the even-numbered address is read on the low-order 8 bit data bus 5.

Next, description will be made of a case in which the BYTE signal is "H". On this occasion, the access in 16 bits is inhibited in the memory IC 100 and the CPU is capable only of the 8 bit data access. On this occasion, as for the signal state, there are two cases, namely, ③ accessing the EPROM 9 for the even-numbered address and ④ accessing the EPROM 10 for the odd-numbered address. In the former state ③, the output enable signal $\overline{OE}$ and the least significant address signal A0 are both at the "L" level and the byte high enable signal $\overline{BHE}$ is at the "H". In the latter state ④, the output enable signal $\overline{OE}$ and the byte high enable signal $\overline{BHE}$ are both at the "L" level and the least significant address signal A0 is at the "H" level. In the state ③, the output of the NAND gate 23 becomes "L" level, the output of the NAND gate 27 becomes the "H" level, only the transfer gate 15 turns on and therefore, the data input/output terminal 63 of the EPROM 9 is connected to the low-order 8 bit data bus 5, as is described in the foregoing. On the other hand, since the byte high enable signal $\overline{BHE}$ is at the "H" level, the output of the inverter 29 becomes "L" level. Consequently, the outputs of the NAND gates 25 and 31 both become "H" and the transfer gates 19 and 20 both turn off. Even if the BYTE signal is "H", the NAND gates 24 and 28 both output signals of "H" level, since the least significant address signal A0 is at the "L" level denoting the even-number and the output enable signal $\overline{OE}$ is at the "L" level. As a result, the transfer gates 17 and 18 both turn off and the EPROM 10 is separated from the data input/output buses 5 and 6. Therefore, data of even-numbered address only is read on the low-order data bus 5.

In the state ④, since the least significant address signal A0 is at the "H" level, the output of the inverter 22 becomes "L" level and the NAND gates 23 and 27 both output signals of "H" level. Consequently, transfer gates 15 and 16 both turn off. As a result, the data input/output terminal 63 of the EPROM 9 for the even-numbered address is isolated from the low-order data bus 5. Meanwhile, in this state, the byte high enable signal $\overline{BHE}$ is at the "L" level and the BYTE signal is at the "H" level. Therefore, the output of the inverter 30 receiving the BYTE signal becomes "L" level. Consequently, the outputs of the NAND gates 25 and 31 both become "H" level and the transfer gates 19 and 20 both turn off and are isolated from the high-order data bus 6. In this state, the output of the inverter 21, the BYTE signal and the least significant address signal A0 are all at the "H" level, so that all inputs to the NAND gate 24 are the signals of "H" level. Consequently, the output of the NAND gate 24 becomes "L" level and the transfer gate 17 turns on. On the other hand, since the NAND gate 28 receives the output enable signal $\overline{OE}$ of the "L" level, the output thereof becomes "H" level and the transfer gate 18 turns off. As a result, the 8 bit data input/output terminal 73 of the EPROM 10 for the odd-numbered address is connected to the low-order 8 bit data bus and the 8 bit data of the odd-numbered address appears on the low-order data bus 5.

Next, description will be made of a case in which data is written in the EPROMs 9 and 10 using a conventional 8 bit PROM writer. In this case, first the BYTE signal is set at the "H" level. In this state, the output of the inverter 30 receiving the BYTE signal becomes "L" level, so that the outputs of the NAND gates 25 and 31 both become "H" level and the transfer gates 19 and 20 both turn off. In writing data in this state, the chip enable signal $\overline{CE}$ becomes "L" and the output enable signal $\overline{OE}$ becomes "H" level. In programming the data, the high voltage $V_{pp}$ for programming is raised to 12.5 V and the supply voltage $V_{cc}$ is also raised to 6 V. Description will be made of a case in which the 8 bit data to be written has the even-numbered address, namely, the least significant address signal A0 is at the "L" level. The output of the inverter 22 becomes "H" and the output of the inverter 21 becomes "L". Consequently, the output of the NAND gate 27 becomes "L" level and the transfer gate 16 turns on. Since the output of the inverter 21 is at "L" level, the output of the NAND gate 23 becomes "H" level and the transfer gate 15 turn off. Consequently, the data appeared on the low-order 8 bit data bus 5 is written in the data input terminal 63 of the EPROM 9 through the transfer gate 16. On the other hand, if the address for a data to be written is even-numbered, that is, if the least significant address signal A0 is at the "H" level, the byte high enable signal $\overline{BHE}$ becomes "L" level. Since the byte signal BYTE is at the "H" level, the outputs of the NAND gates 25 and 31 are both made "H" level by the inverter 30 and the transfer gates 19 and 20 are off. Meanwhile, the address signal A0 is at the "L" level and the output of the inverter 21 is at the "L", so that the output of the NAND gate 24 becomes "H" and the output of the NAND gate 28 becomes the "L" level. Consequently, the transfer gate 17 turns off and the transfer gate 18 turns on. Accordingly, in this state, the 8 bit data having odd-numbered address is written through the low-order data bus 5 and the transfer gate 18.

The program inhibition mode is the same as the data writing (program mode), however, since the chip enable signal $\overline{CE}$ is at the "H" level, neither the EPROM 9 nor 10 operates and, since the output enable signal $\overline{OE}$ is at the "H" level, input/output of the data is not carried out. In the program verify mode, the output enable signal $\overline{OE}$ is at the "L" level, the reading of data which has been written is carried out in the same manner as in the data reading and the verification of the program data is carried out. Therefore, by selecting the BYTE signal level depending on the even-numbered address and odd-numbered address, the writing of data using a conventional 8 bit PROM writer can be carried out.

Meanwhile, by designating 8 bit access using BYTE signal, the data always appears only on the low-order 8 bit data bus 5.

Figure 14:
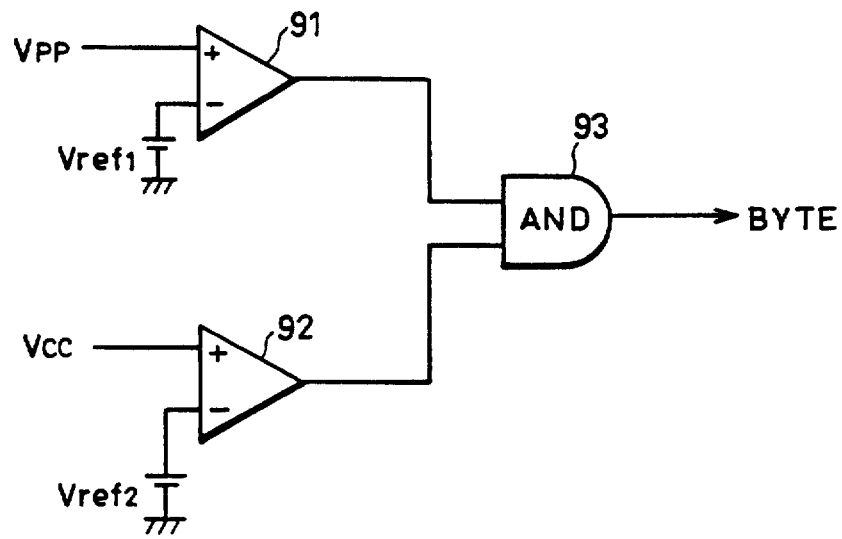
FIG. 14 shows another structure of a BYTE signal generation circuit employed in the structure of FIG. 12.

Although the BYTE signal is applied externally in the above described structure by the CPU, the writing of data can be carried out automatically using only the low-order 8 bit data bus 5 in programming, by providing a comparator 91 which compares the high voltage $V_{pp}$ for programming and the reference voltage $V_{ref}1$, a comparator 92 which compares the supply voltage $V_{cc}$ and the reference voltage $V_{ref}2$ and an AND gate 93 which receives the outputs of the comparators 91 and 92 to generate the BYTE signal, as shown in FIG. 14.

Although the above described memory IC comprises two 8 bit EPROMs, a 16 bit EPROM may be used instead of the above described structure to perform the same operation. More specifically, in the structure shown in FIG. 12, by replacing the data input/output terminal 73 of the EPROM 10 for the odd-numbered address by a high-order 8 bit data input/output terminal, a 16 bit EPROM memory IC can be implemented by using the same decoder circuits 150 and 200.

Figure 15:
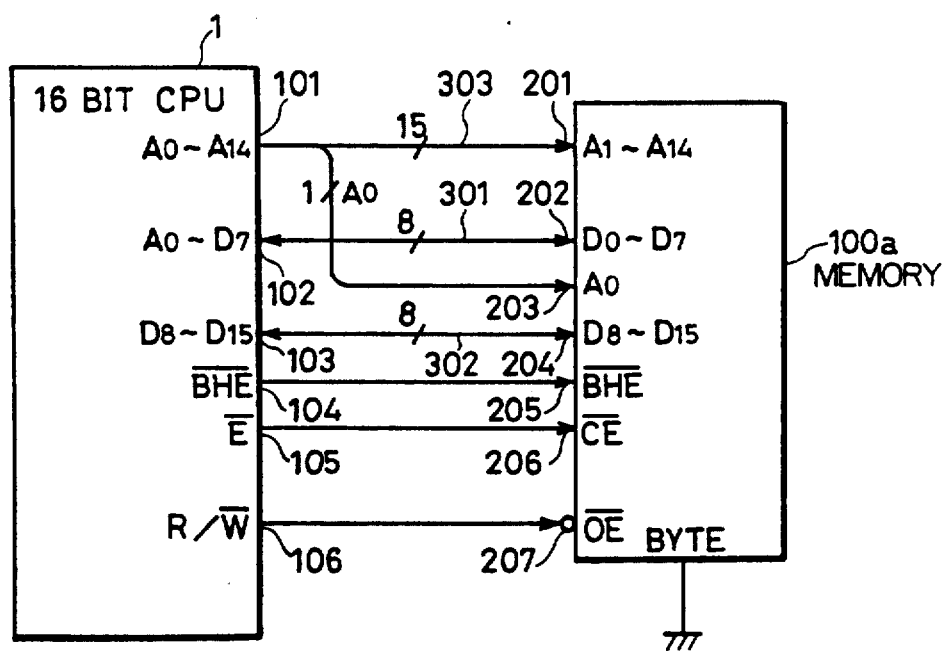
FIG. 15 shows the structure of connections between the 16 bit CPU and a 16 bit memory IC in the 16 bit bus mode.

FIG. 15 shows the connection in the system in which a memory device comprised of a 16 bit EPROM, for example, connected to the 16 bit CPU. In the structure of FIG. 15, the 16 bit CPU 1 comprises an address output terminal 101 for outputting 15 bit addresses, a low-order data input/output terminal 102 for inputting and outputting low-order 8 bit data, a high-order 8 bit data input/output terminal 103 for inputting and outputting the high-order 8 bit data, a byte high enable terminal 104 for outputting the byte high enable signal $\overline{BHE}$, an enable terminal 105 for outputting the signal enable signal $\overline{E}$ for activating the memory and an $R/\overline{W}$ signal output terminal 106 for designating the read/write cycle of the memory.

Meanwhile, the memory IC 100a, which is in this example implemented by the 16-bit EPROM, is a 16-bit memory IC which may be, alternatively, comprised of other 16-bit RAM and the like, comprising an address input terminal 201 for receiving 14 bit address signals A1 to A14 through an address bus 303, an low-order data input/output terminal 202 for inputting and outputting low-order 8 bit data through a low-order data bus 301, a terminal 203 receiving the least significant address signal A0 designating the even-numbered address and the odd-numbered address, a data input/output terminal 204 for inputting and outputting the high-order 8 bit data through a high-order data bus 302, a byte high enable input terminal 205 for receiving the byte high enable signal $\overline{BHE}$, a chip enable terminal 206 for receiving the enable signal $\overline{E}$ from the CPU and an output enable terminal 207 for inverting and receiving the $R/\overline{W}$ signal from the CPU 1. In this structure, the BYTE input terminal is grounded. Therefore, the memory IC 100a is capable of operating both in the 16 bit and 8 bit modes. If the memory IC 100a is implemented by an RAM, the program mode in the EPROM corresponds to the writing mode. However, the high voltage $V_{pp}$ for programming is not generated. The memory IC contains the decoder circuits 150 and 200 of FIG. 12.

FIG. 16 shows the waveform of the operation of the memory IC shown in FIG. 15 in the 16 bit bus mode. The operation of the 16 bit memory IC in accordance with another embodiment of the present invention will be hereinafter described with reference to the FIGS. 15 and 16. In this structure, the BYTE signal is grounded and the BYTE signal is at "L". As is described with reference to FIG. 12, in this case the low-order 8 bit data always appears on the low-order 8 bit data bus 301 while the high-order 8 bit data appears on the high-order 8 bit data bus 302. Namely, in the above described structure, when the byte high enable signal $\overline{BHE}$ denotes the access in 16 bits by "L", an address signal of even-numbered appears on the address bus 303 and the least significant address signal A0 becomes the "L" level. When the enable signal $\overline{E}$ falls and the chip enable terminal 206 of the memory IC 100a is activated, the data for the even-numbered address appears on the low-order 8 bit data bus 301 and the 8 bit data for the odd-numbered address appears on the high-order 8 bit data bus 302. On this occasion, whether the data should be written or not in the memory IC 100a is selected by the read/write signal $R/\overline{W}$. When the output enable terminal 207 is at the "L" level, it becomes the reading mode and when it is at the "H" level, it become the write mode. In this state, when the byte high enable signal $\overline{BHE}$ is at "H" and the address signal A0 designates the even-numbered address, the 8 bit data will be read or written through the low-order 8 bit data bus 301 and, in the reverse case, the 8 bit data of the odd-numbered address appears on the high-order 8 bit data bus 302.

Figure 17:
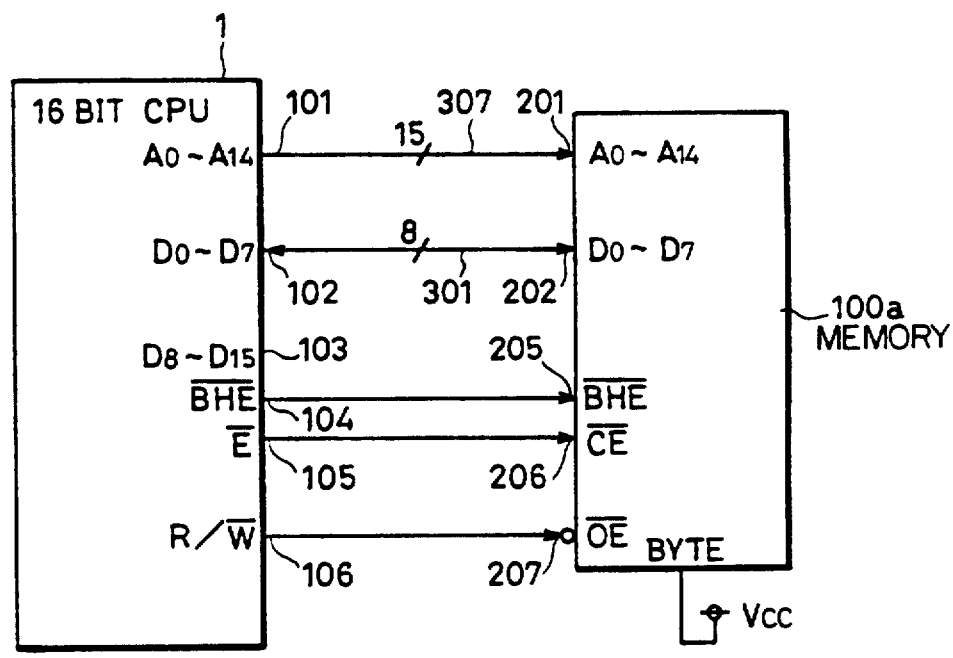
FIG. 17 shows the structure of connections between the CPU and the memory IC in which the 16 bit memory IC is used in the 8 bit bus mode.

FIG. 17 shows the connections in the 8 bit bus mode employing only the low-order 8 bit bus as the data bus of the CPU 1. Referring to FIG. 17, the BYTE terminal of the memory IC 100a is connected to the supply potential $V_{cc}$ and the BYTE signal is set at "H" level. In this case, either the information of the even-numbered address or the information of the odd-numbered address appears on the low-order 8 bit data bus 301 in response to the "H" level or the "L" level of the least significant address signal A0, as described above with reference to FIG. 12.

Figure 18:
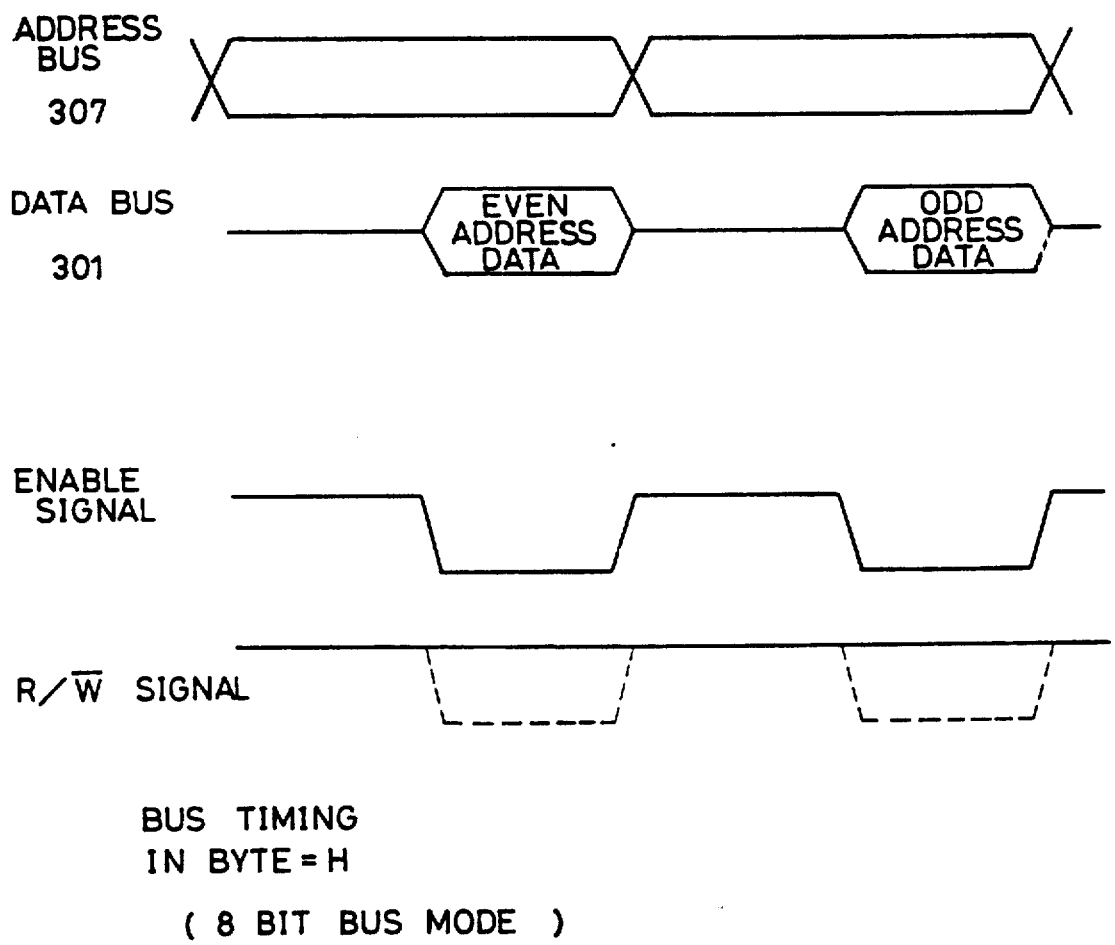
FIG. 18 shows waveforms of signals illustrating the data reading/writing operation in the structure shown in FIG. 17.

FIG. 18 is a waveform diagram showing the operation in the 8 bit bus mode in the system shown in FIG. 17. Referring to FIG. 18, the data of the even-numbered address or odd-numbered address appears on the low-order 8 bit data bus 301 in response to the enable signal E and in correspondence with the address signals A0 to A14. In this structure, either the data of the odd-numbered address or the data of the even-numbered address appears on the data bus 301 in response to the address signal A0.

The above structure can be applied to the RAM by replacing the program mode operation of the EPROM by the data writing operation. Therefore, the relation between the register of the CPU and the 16 bit data in a general 16 bit memory IC will be described with the reference to the figures.

Figure 19:
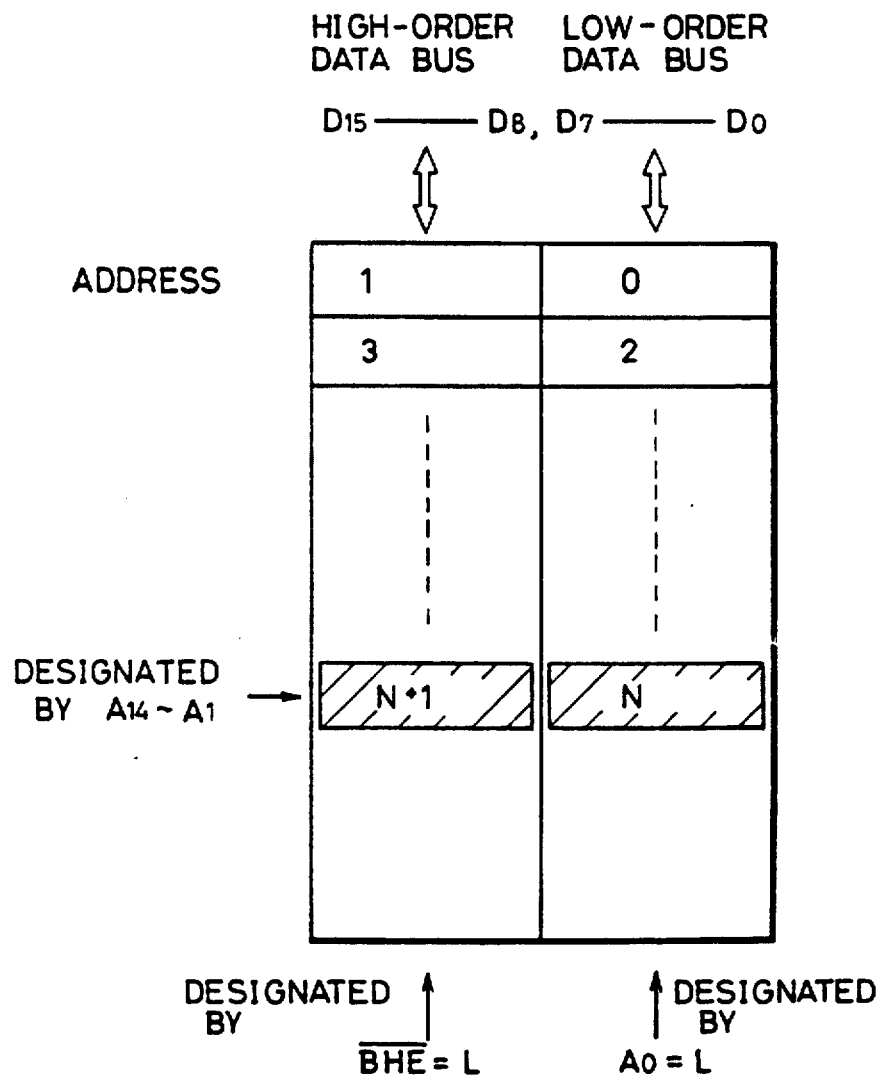
FIG. 19 shows the relation between the memory address and the data bus in the 16 bit bus mode.

FIG. 19 shows the relation between the data appears in the memory IC in the 16 bit bus mode and the data bus. As shown in FIG. 19, when the BYTE signal is "L", the memory IC has the 16 bit bus mode and it is capable of generating data either of 16 bit or 8 bit. However, in this case, the data D0 to D7 having even-numbered address are outputted on the low-order data bus and the data D8 to D15 having odd-numbered addresses appear on the high-order 8 bit data bus, as is apparent from the above description. In designating 8 bit data, for example, in this state, if the $\overline{BHE}$ signal is made "H" and the least significant address signal A0 is made "L", only the data having even-numbered address appears on the low-order data bus, and if the byte high enable signal $\overline{BHE}$ is set at "L" and the least significant address signal A0 is made "H", only the data having odd-numbered address appears on the high-order data bus. In this case, writing/reading between registers in the CPU and the memory IC is carried out in one to one correspondence in the same manner as in the conventional structure. Namely, the high-order data bus is connected to the high-order register and the low-order data bus is connected to the low-order register.

Figure 20:
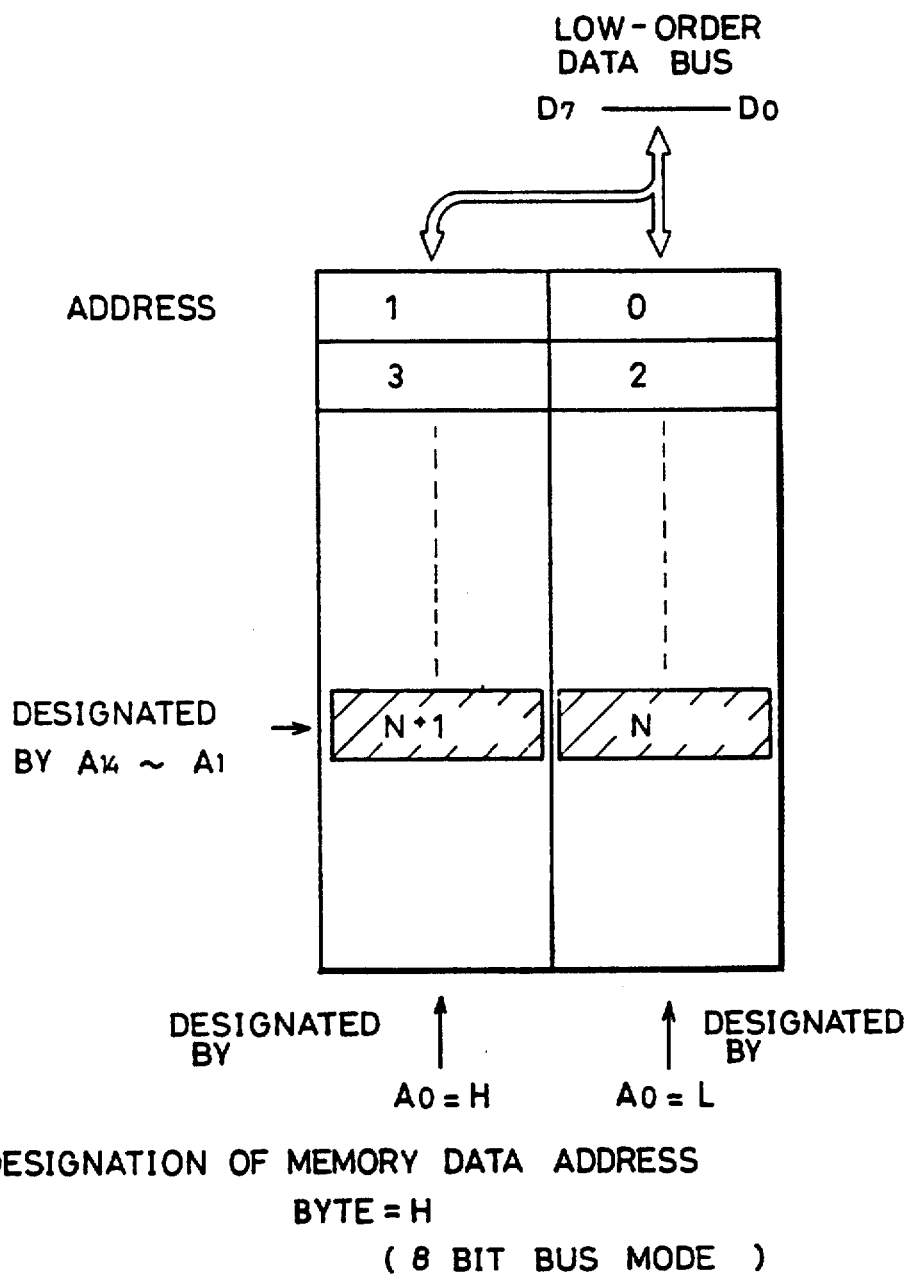
FIG. 20 shows the relation between the memory address and the data bus in the 8 bit bus mode.

FIG. 20 shows the relation between the address and the data bus on which the information appears when the memory IC is used in the 8 bit bus mode. In this case, the BYTE signal is made "H" to set the 8 bit bus mode and, only the low-order 8 bit data bus is used. Therefore, when the least significant address signal A0 designates the even-numbered address by "L", the data having even-numbered address appears on the low-order data bus and if the least significant address signal A0 is at the "H" level designating the odd-numbered address, the odd-numbered address data input/output terminal is connected to the low-order data bus, regardless of the byte high enable signal $\overline{BHE}$. Consequently, access to both the even-numbered address and the odd-numbered address become possible, using only the low-order data bus.

Figure 21:
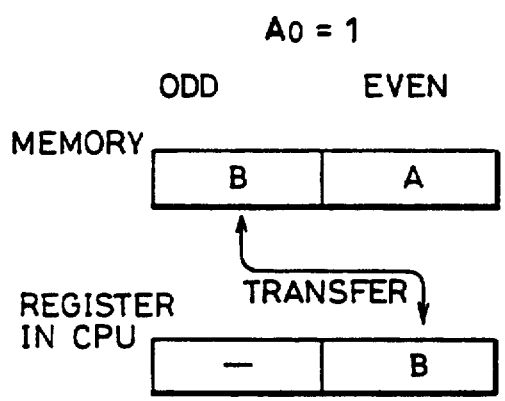
FIGS. 21 and 22 show the corresponding relation between the memory address and the register in the CPU in the 8 bit bus mode.
Figure 22:
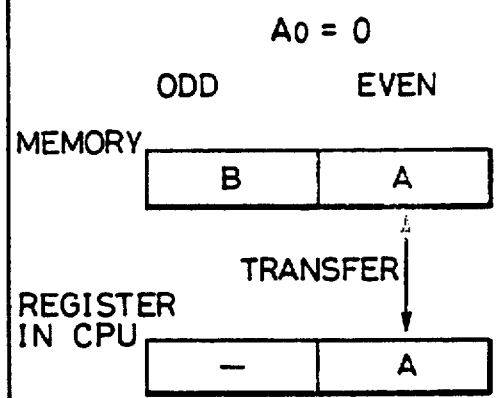

FIGS. 21 and 22 show the relation between the register in the CPU and the odd-numbered/even-numbered address of the memory IC in the 8 bit bus mode. As shown in FIG. 17, when the BYTE signal is "H" and the mode is 8 bit bus mode, if the address signal A0 is "1" ("H") designating the odd number, the information of the odd-numbered address is transferred to the low-order register. It goes without saying that the reverse operation is also possible. Namely, the low-order register out of the registers in the CPU is connected to the odd-numbered addresses in the memory IC.

Next, as shown in FIG. 22, when the BYTE signal is "H" and the even-numbered address is designated, that is, the least significant address signal A0 is at the "0" ("L") level, storage locations of odd-numbered addresses are connected to the low-order register in the CPU through the low-order data path. Therefore, if the data of 8 bit only is required, the low-order 8 bit register is immediately accessed to perform reading/writing without using an exchange instruction. Since the contents in the high-order register need not be transferred to the low-order register by using the exchange instruction or the like, the data processing speed can be significantly increased as compared with the conventional device.

The improvement in data processing according to the present invention will be described in more detail with reference to a specific program. The case where in the memory system of FIG. 23, 16-bit CPU 500 performs 8-bit data processing according to the program shown in FIG. 25A is considered.

In FIG. 23, the 16-bit CPU 500 has a high byte data line 513 connected to a high byte data bus DBH and a low byte data line 514 connected to a low byte data bus DBL. A memory 510 for storing data of odd-numbered address is selectively coupled to either the data bus DBH or the data bus DBL through a selector 700. A memory 520 for storing data of even-numbered address is selectively coupled to the data bus DBL through the selector 700. The memory system of FIG. 23 has a memory mapping or memory locations as shown in FIG. 24.

As shown in FIGS. 25A to 25C, in the system of the present invention, accessing to the memories 510 and 520 is performed independently in the separate program steps, and the byte swapping operation is not required, resulting in simplification of the program and reduction in program steps. Thus, even though the program forms a loop, no time loss required for byte swapping is accumulated, thus providing a fast processing of 8-bit data.

Figures 26, 27:
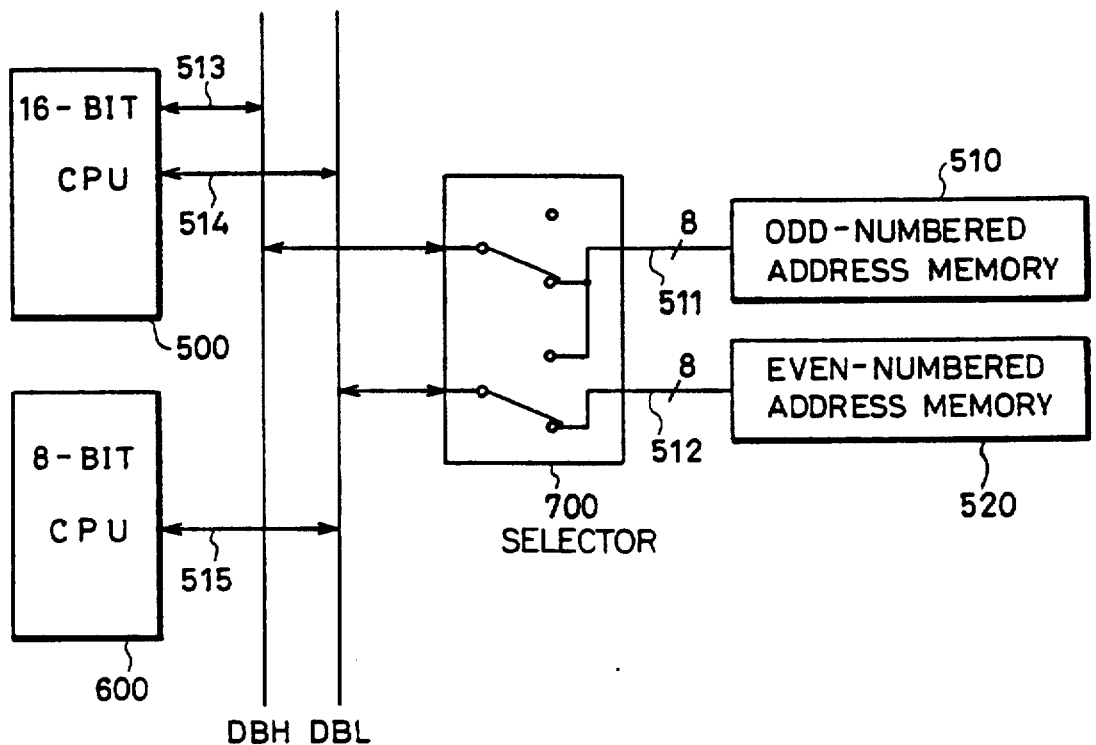
FIG. 26 is a schematic of a multi CPU system according to an embodiment of the present invention.
FIG. 27 shows memory locations used in the multi CPU system of FIG. 26.

In addition, when an 8-bit CPU 600 is additionally provided to constitute a multi CPU system as shown in FIG. 26, the 8-bit CPU 600 can access to every memory location of FIG. 27 regardless of even-address and odd-address by virtue of the selector 700.

Figure 28:
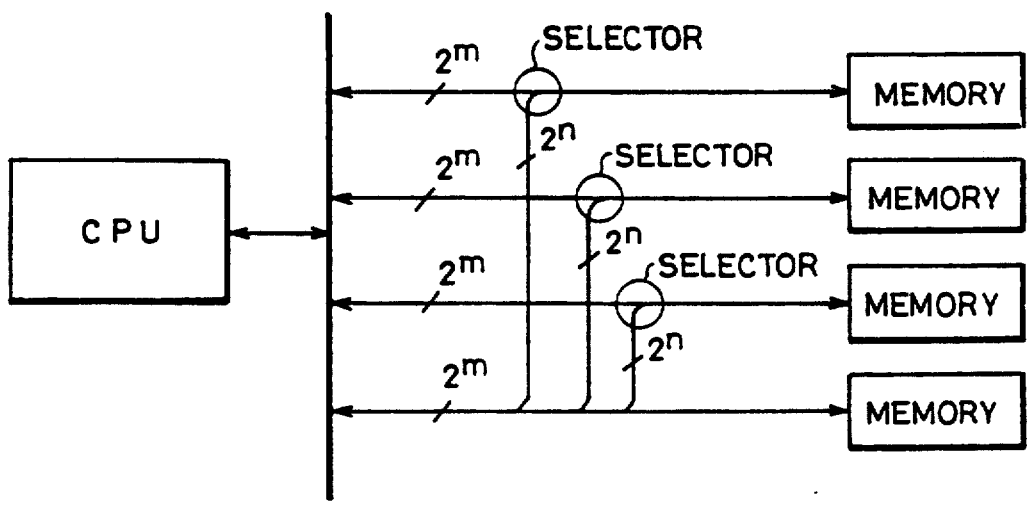
FIG. 28 is a schematic of another embodiment of the present invention.

Although in the above described embodiments the CPU has 16 bit structure and is accessible in 8 bits and in 16 bits, the CPU is not limited to this and it may have 32 bit structure, 64 bit structure or larger bit structure, and the same effect as in the above described embodiment can be obtained provided that the memory IC can be accessed by the bit number which is the least access unit of the CPU, as shown in FIG. 28. As for the memory device to be employed, memory devices other than EPROM or RAM may be used to obtain the same effect as in the above described embodiment.

Although the BYTE signal is fixed at "H" or "L" in the above described embodiment, it may be applied from the CPU depending on the contents of the processing.

Although, in the above described embodiments, the selector for selectively coupling the low-byte data bus to either high byte memory or low byte memory is formed of hardware components, a firmware configuration can be alternatively employed to provide a data processing system with fast data processing.

Figure 29:
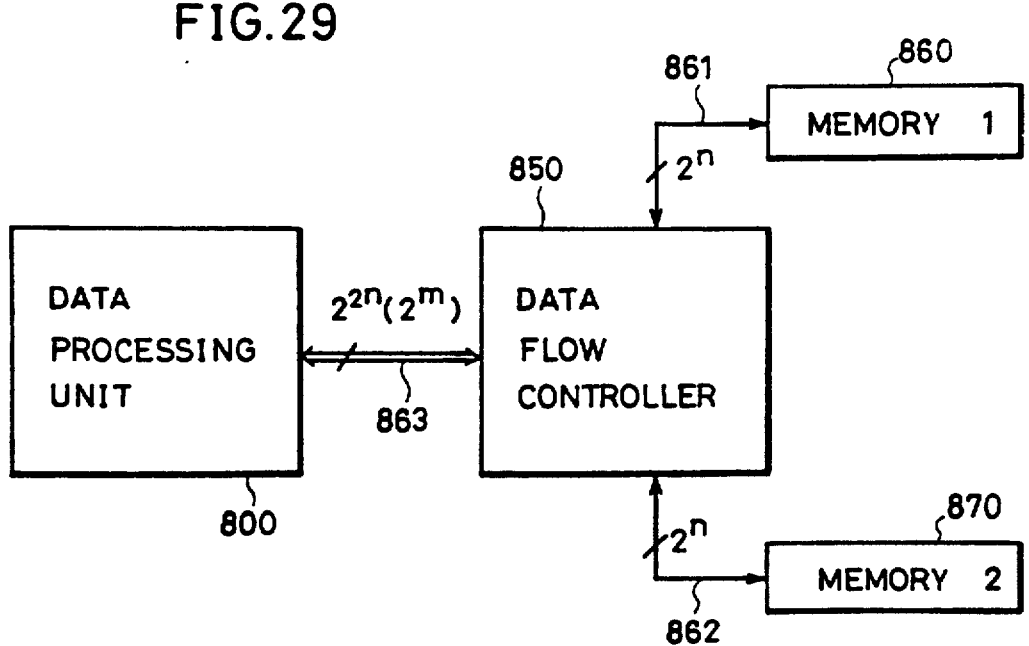
FIG. 29 is a schematic of further another embodiment of the present invention.

Referring to FIG. 29, the data processing system comprises a data processing unit 800 capable of processing data in $2^n$ bits and $2^m$ bits (m>n), a data flow controller 850 of a firmware structure for controlling data flow between the processing unit 800 and memories 860, 870, and first and second memories 860, 870 each storing data of $2^n$ bits. Data bus 863 between the data processing unit 800 and the data flow controller 850 comprises high-order data lines of $2^n$ bits and low-order data lines of $2^n$ bits.

Figure 30:
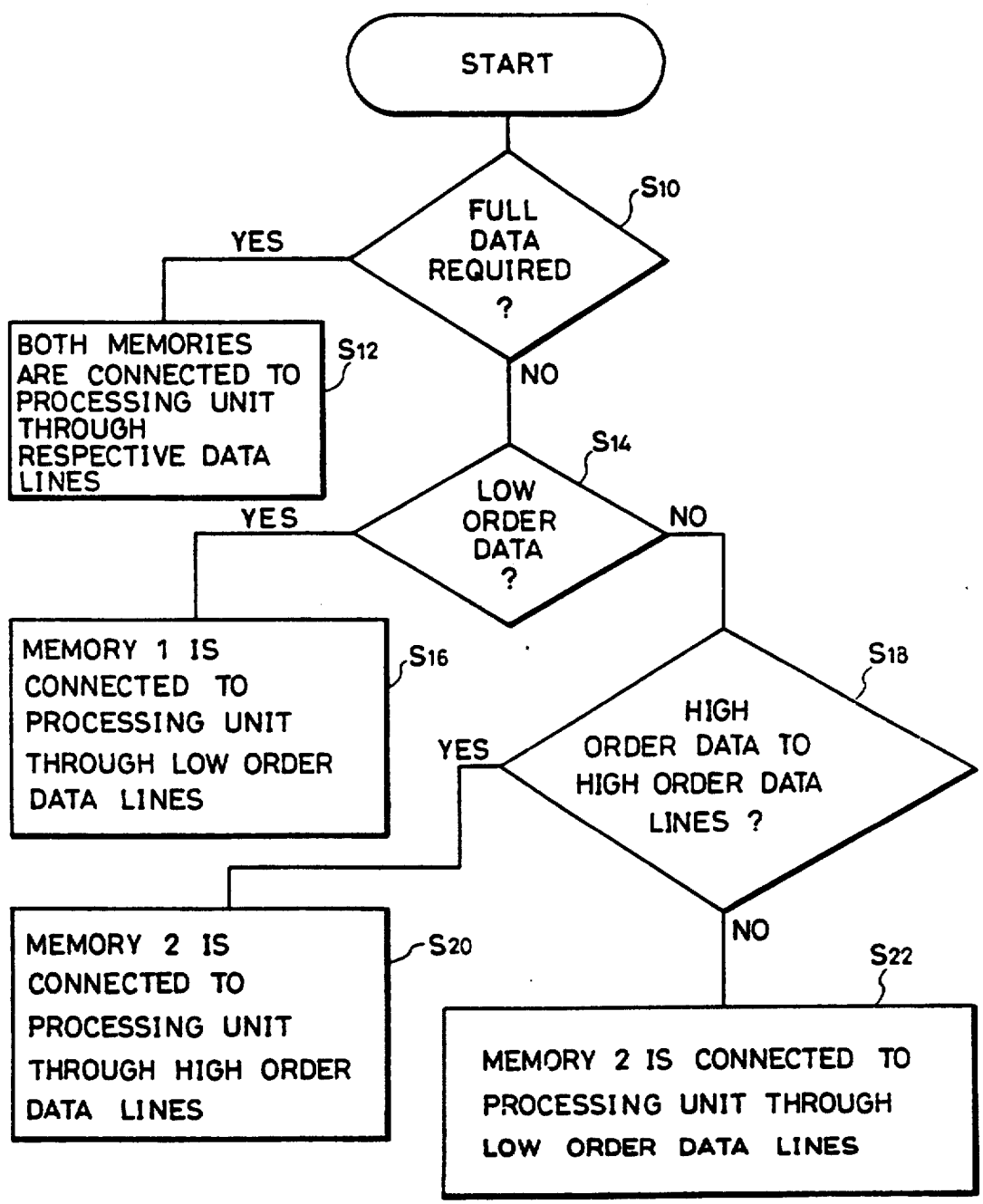
FIG. 30 is a flow chart diagram explaining the operation of the data processing system of FIG. 29.

FIG. 30 is a flow chart diagram for describing the operation of the data flow controller 850. The operation of the data flow controller will be briefly described with reference to FIGS. 29 and 30.

When the controller decides that transmission of full data of $2^m$ bits is requested by the processing unit 800 (step 10), the controller 850 connects the data buses 861, 862 of $2^n$ bits to the $2^m$ bits data bus 863 in parallel (step 12).

When the controller 850 decides that transmission of only low-order data is requested (step 14), the controller 850 connects the $2^n$ bit data bus 861 for the first memory 860 to the low-order data lines included in the $2^m$ bit data bus 863 (step 16). If low-order data is not requested, the program advances to the decision block (S18) to decide whether accessing to the second memory 870 through the high-order data lines included in the $2^m$ bit data bus 863 is requested. When the decision is affirmative, the data bus 862 is connected to the high-order data lines included in the data bus 863 (step 20). When the decision is negative, the data bus 862 is coupled to the low-order data lines included in the data bus 863 (step 22).

As described above, according to the present invention, in a system comprising a $2^m$ bit structure CPU which is accessible in $2^n$ bits (m>n) at the least and a memory IC which is accessible in $2^n$ bits as well as $n2^m$ bits, the low-order $2^n$ bit data bus only is selectively used to connect the CPU and the memory IC in response to the high-order address activating signal and a bus selecting signal (bit length designating signal) in accessing in $2^n$ bits. Therefore, the desired address of the memory IC can be connected to the low-order register in the CPU when the necessity arises. Further, since an exchange instruction or the like is not needed in the data processing, the data can be processed at high speed. In addition, the high-order $2^n$ bit data is made selectively to appear on either the corresponding high-order data bus or the low-order data bus, and therefor, memory having the $2^n$ bit structure may be employed in the CPU of $2^m$ bit structure such as 16 bits or 32 bits to operate without any problem.

In addition, if the memory IC comprises a plurality of EPROMs of 8 bit structure, programming can be always carried out using the low-order 8 bit data bus only, so that the data can be written by a conventional 8 bit PROM writer. Therefore, EPROMs can be obtained which always store the exact pair of information, since the corresponding relation between the even-numbered address and odd-numbered address in the data is not mistaken in the writing. In addition, by virtue of this structure, the data which is to be the data base used in a conventional 8 bit CPU can be employed in the high-level 16 bit, etc., CPU, so that a high-level microcomputer can be used while maintaining the continuity with the prior art, whereby the performance of the existing computer systems can be easily enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory circuit comprising:
   an integrated circuit memory device accessible by a $2^n$ bit word, where n is an integer, and having reading and writing modes of operation;
   first data input/output terminals for transmitting $2^m$ bit data words, where m is an integer greater than n, said first data input/output terminals being coupled to an external device for reading and writing the data words;
   said memory device including second data input/output terminals for transmitting $2^m$ bit data words;
   memory terminal means coupled to the external device for receiving a mode of operation selecting signal designating a bit length of data to be accessed for said memory device in the reading and writing modes of operation, said bit length being variable in accordance with the mode of operation;
   address means responsive to an address designating signal designating the address to be accessed for said memory device; and
   connecting means for connecting data input/output terminals, of the number designated by said data bit length designating signal, of said second data input/output terminals to a low-order data input/output terminal of said first data input/output terminals in response to said data bit length designating signal and said address designating signal;
   said data bit length designating signal including a signal generated in response to a data programming mode instructing signal, said connecting means including means for transferring data to be programmed in said memory device in the writing mode of operation only through said low-order data input/output terminal to said second data input/output terminals.

2. A memory IC according to claim 1, wherein
   said memory device has even-numbered addresses and odd-numbered addresses each of which designates a storage location of $2^n$ bit data, and when said data bit length designating signal designates $2^m$ bit, the successive addresses of an odd-numbered address and an even-numbered address are simultaneously accessed to form $2^m$ bit data, where said odd-numbered address constitute a high-order data and said even-numbered address constitute a low-order data, and
   said selective connecting means connects, when said address designating signal designates a high-order data belonging to an odd-numbered address and said bit length designating signal designates $2^n$ bit, the $2^n$ data input/output terminals corresponding to the address selected by said address designating signal out of said second data input/output terminals only to the low-order $2^n$ data input/output terminals of said first data input/output terminals.

3. A memory IC according to claim 1, wherein said address designating signal comprises a high-order data activating signal and a signal showing whether the memory address to be accessed is a high-order address or a low-order address.

4. A memory IC according to any one of claim 1 wherein said selective connecting means comprises
   first decoder means provided for the low-order address data input/output terminal of said first and second data input/output terminals and receiving an output enable signal and a signal showing the high-order/low-order of the memory address for determining that a low-order address is accessed, and second decoder means provided for the high-order address data input/output terminals of said first and second data input/output terminals and receiving said bit length designating signal, said high-order/low-order designating signal and said high-order address data activating signal, for determining that a high-order address is accessed and that the accessed high-order second data input/output terminals is required to be connected to low-order first data input/output terminals.

5. Data processing system for processing data selectively in $2^n$ and $2^m$ bits, comprising:

an integrated circuit memory device accessible by a $2^n$ bit word, where n is an integer, and having reading and writing modes of operation;

first data input/output terminals for transmitting $2^m$ bit data words, where m is an integer greater than n, said first data input/output terminals being coupled to an external device for reading and writing the data words;

said memory device including second data input/output terminals for transmitting $2^m$ bit data words;

memory terminal means coupled to the external device for receiving a mode of operation selecting signal designating a bit length of data to be accessed for said memory device in the reading and writing modes of operation, said bit length being variable in accordance with the mode of operation;

address means responsive to an address designating signal designating the address to be accessed for said memory device, and connecting means for connecting data input/output terminals, of the number designated by said data bit length designating signal, of said second data input/output terminals to a low-order data input/output terminal of said first data input/output terminals in response to said data bit length designating signal and said address designating signal;

said data bit length designating signal including a signal generated in response to a data programming mode instructing signal, said connecting means including means for transferring data to be programmed in said memory device in the writing mode of operation only through said low-order data input/output terminal to said second data input/output terminals.

6. An accessing method for an integrated circuit memory device accessible by a $2^n$ bit word, where n is an integer, including first data input/output terminals for transmitting $2^m$ bit data words, where m is an integer greater than n; said memory device including second data input/output terminals for transmitting $2^m$ bit data words, said method comprising the steps of:

generating a data bit length designating signal in response to a mode of operation selecting signal, said bit length designating signal designating a bit length of data to be accessed for said memory device in reading and writing modes of operation, said bit length being variable in accordance with the mode of operation;

generating an address designating signal designating the address to be accessed for said memory device;

connecting data input/output terminals, of the number designated by said data bit length designating signal, of said second data input/output terminals to a low-order data input/output terminal of said first data input/output terminals in response to said data bit length designating signal and said address designating signal; and transferring data to be programmed in said memory device in the writing mode of operation only through said low-order data input/output terminal to said second data input/output terminals.

* * * * *